United States Patent [19]
Yasukawa et al.

[11] Patent Number: 5,220,547
[45] Date of Patent: Jun. 15, 1993

[54] METHOD AND DEVICE FOR CONTROLLING OPTICAL HEAD MOVING SPEED

[75] Inventors: Kaoru Yasukawa; Daisuke Iguchi; Kiichi Ueyanagi, all of Ebina, Japan

[73] Assignee: Fuji Xerox Co., ltd., Tokyo, Japan

[21] Appl. No.: 770,113

[22] Filed: Oct. 2, 1991

[30] Foreign Application Priority Data

Dec. 20, 1990 [JP] Japan .................................. 2-411987
Jul. 17, 1991 [JP] Japan .................................. 3-201138

[51] Int. Cl.⁵ ............................................. G11B 7/00
[52] U.S. Cl. .................................. 369/32; 360/78.04; 369/44.28
[58] Field of Search ................. 369/32, 44.28, 54; 360/78.04

[56] References Cited

U.S. PATENT DOCUMENTS

| | | | |
|---|---|---|---|
| 4,835,752 | 5/1989 | Nakatsu et al. | 369/32 |
| 4,901,299 | 2/1990 | Nakatsu | 369/32 |
| 4,955,009 | 9/1990 | Nakatsu et al. | 369/32 |

OTHER PUBLICATIONS

National Technical Report, vol. 35, No. 2, Apr. 1989, pp. 67-73.

"The Television Society", vol. 44, No. 10, pp. 1391-1397 (1990).

"An 86 mm magneto-optical disk drive with a compact and fast-seek-time optical head", SPIE, vol. 1316, Optical Data Storage (1990) pp. 2-10.

Primary Examiner—Steven Mottola
Assistant Examiner—Tan Dinh
Attorney, Agent, or Firm—Finnegan, Henderson, Farabow, Garrett & Dunner

[57] ABSTRACT

This invention has an object to provide speed control method and device for an optical head in which a decelerating operation and so on for the optical head is carried out at an uniform deceleration or acceleration mode at high speed, and a speed control is carried out sufficiently accurately with excellent seekability and simple construction. The speed control device for the optical head according to this invention is so constructed that in the speed control of the seek operation of the optical head using feedback of a difference signal between a reference speed signal and a speed detection signal, the reference speed signal is switched to a ground level when a residual track number is below a predetermined value, and the optical head is pulled into a tracking servo operation when a predetermined time has elapsed since the switching time of the reference speed signal to the ground level.

16 Claims, 21 Drawing Sheets

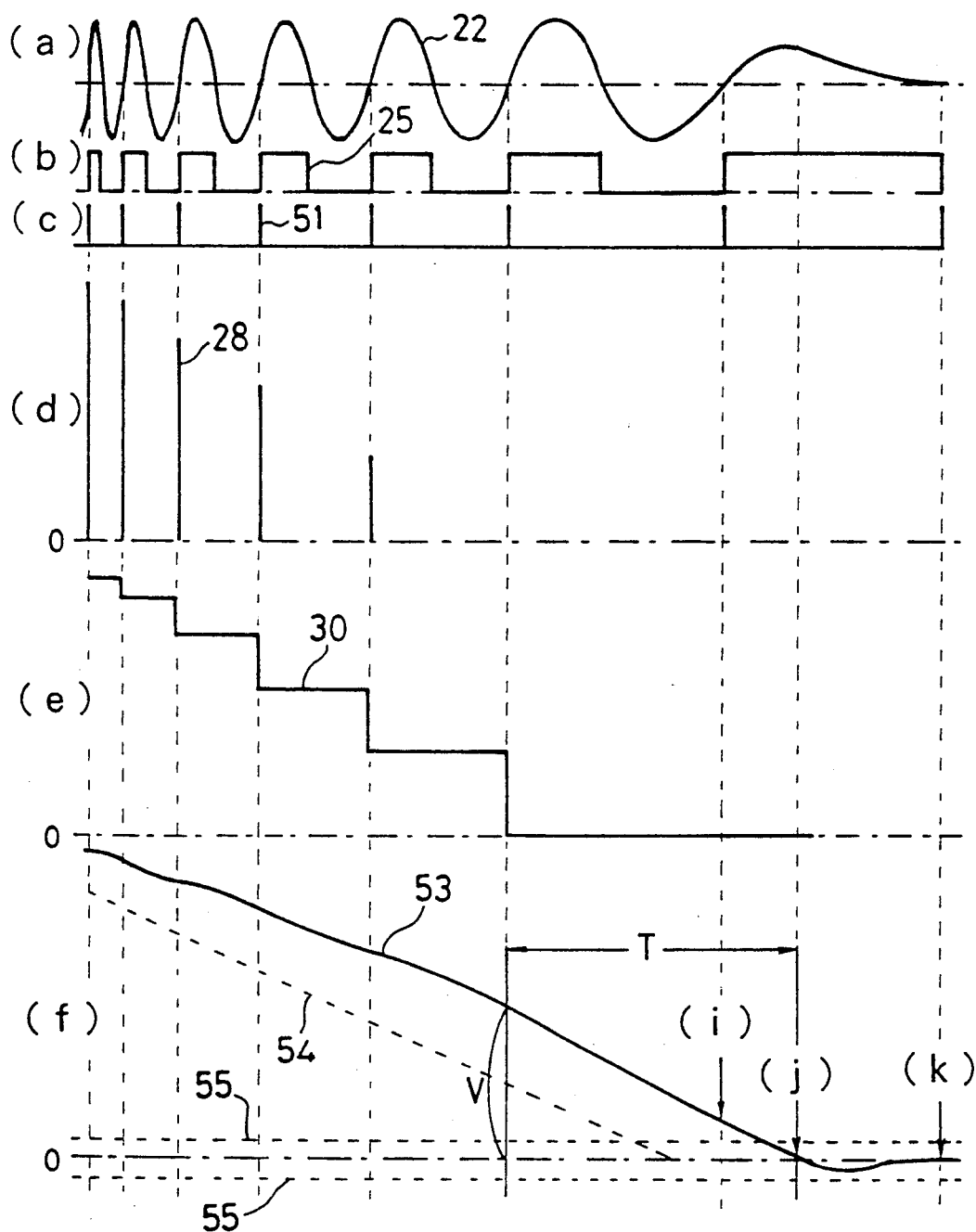

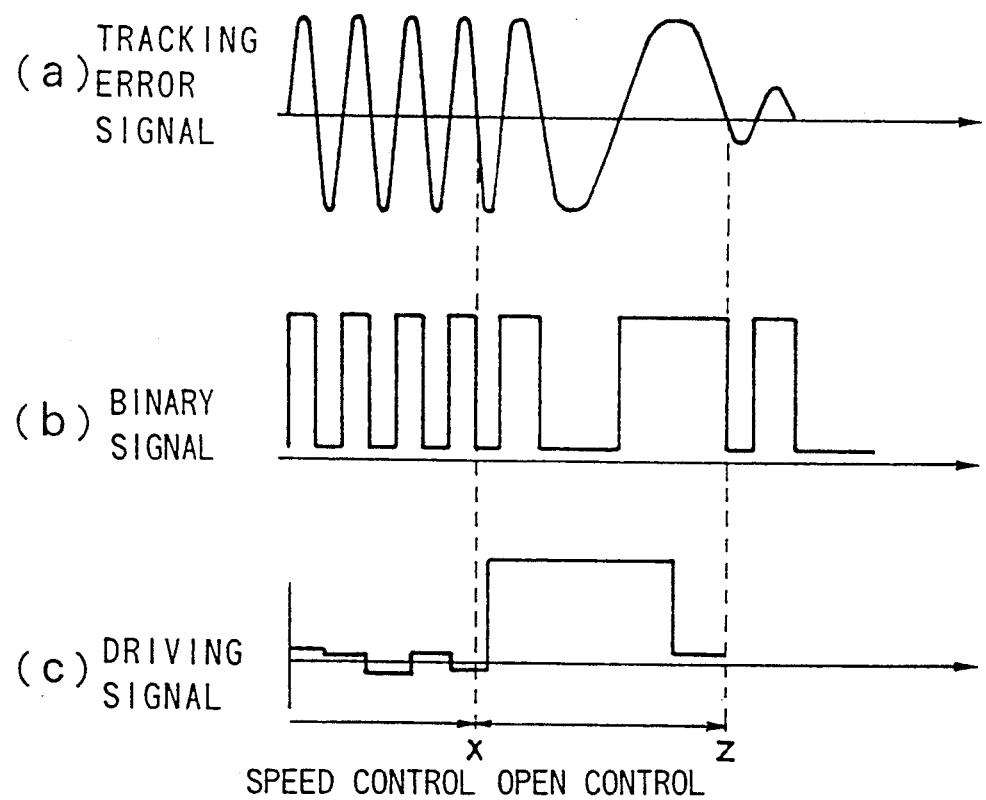

METHOD AND DEVICE FOR CONTROLLING OPTICAL HEAD MOVING SPEED

FIELD OF THE INVENTION

This invention relates to method and device for controlling an optical head moving speed, which are used for an optical information recording and reproducing apparatus for irradiating a convergent light such as a semiconductor laser beam, a gas laser beam or the like to an optical recording medium such as an optical disk to optically record and reproduce information, or to optically record, reproduce and erase information and which serve to seekably move an optical head to a desired track (destination track) or the like on the optical recording medium in a reproducing operation for the recorded information or the like.

BACKGROUND OF THE INVENTION

An apparatus, for example as shown in FIG. 12, has been conventionally known as one of the optical information recording and reproducing apparatuses as described above.

In this apparatus, a convergent light 101 for an information recording or reproducing operation is irradiated through an optical system 102 to a recordable surface formed on an optical recording medium 100, and then a reflected light from the optical recording medium 100 is detected by a photodetector 103 such as a photodiode or the like to perform the information recording and reproducing operations. In a case where an information has been already recorded on any one of tracks formed on the optical recording medium 100 and the track is now indicated to reproduce the information recorded on the track, a seek operation for moving an optical head 104 to the track is carried out as follows. The optical head 104 is moved so as to traverse the tracks on the optical recording medium 100, and a signal indicating a traverse motion of the convergent light 101 for the reproducing operation over a track (hereinafter referred to as "track-traverse motion" for each track) is generated and detected every track. The number of track-traverse signals thus obtained is counted every track-traverse motion of the optical head 104 (convergent light 101), and on the basis of the counted track number, the optical head 104 is seekably moved to the desired track.

FIG. 13 shows a conventional speed control device for an optical head which controls a moving speed of the optical head in the seek operation. In this type of the speed control device for the optical head, a convergent light reflected from the optical recording medium is detected by a photodetector of the optical head 104, and is supplied to a tracking error signal detection circuit 105 in which a tracking error signal as shown in FIG. 14(a) is outputted in response to the occurrence of a tracking error. The tracking error signal 106 from the tracking error signal detection circuit 105 is input to a track-traverse detection circuit 107 to output a track-traverse signal 108 as shown in FIG. 14(b). The track-traverse signal 108 is a pulse signal whose logical state (0 or 1)" is inverted every time the tracking error signal 106 passes a zero-cross point as shown in FIG. 14(b). That is, the track-traverse signal 108 represents a track-traverse motion of the optical head 104.

The track-traverse signal 108 thus obtained is input to a track count circuit 109 to count the edge 110 of each pulse (pulse edge) of the track-traverse signal 108 as shown in FIG. 14(c), thereby calculating the number of residual tracks arranged between the current track and the desired (destination) track and outputting a signal 111 representing the number of the residual tracks (hereinafter referred to as "residual track number"). The signal 111 representing the residual track number is input to a reference-speed conversion ROM 112 to output the digital signal of a reference speed 113 as shown in FIG. 14(d) which is assigned to the calculated residual track number, the residual track number serving as an address to the desired track (destination track). Here, the reference-speed conversion ROM 112 is designed so as to output the digital signal of each reference speed every shift from one track to another.

The reference speed signal 113 from the reference-speed conversion ROM 112 is input to a D/A converter 114 to be subjected to a digital-to-analog conversion, thereby obtaining an analog value 115 corresponding to the reference speed signal 113. The analog value is subjected to a zero-order hold until the edge of a next pulse of the track-traverse signal 108 is detected. The reference speed signal 115 as shown in FIG. 14(e) which has been subjected to the zero-order hold, is supplied to the inverse terminal of a differential amplifier 116.

The track-traverse signal 108 from the track traverse detection circuit 107 is also input to a clock count circuit 117 to calculate a time interval between the edges of the successive pulses of the track traverse signal 108 on the basis of a count value of clocks which are outputted from a reference clock circuit 118. That is, the time interval of the successive edges of the track-traverse signal 108 is represented by the count value (the number of counted clocks) from the reference clock circuit. The counted clock number 119 thus obtained is input to a relative-speed conversion ROM 120 and subjected to a inverse-conversion with the count clock number 119 being an address, thereby obtaining a relative speed for the track-traverse motion. The relative speed 121 for the track-traverse motion thus obtained is converted into an analog signal 123 in a D/A converter 122 and then is input to the non-inverse terminal of the differential amplifier 116.

A different between the reference speed signal 115 and the relative speed signal 123 for the current track traverse motion is amplified by the differential amplifier 116, and an output signal 124 from the differential amplifier 116 is supplied through a switching circuit 125 and a driver amplifier 126 to a head actuator 127 for driving the optical head 104 to the desired track at a prescribed speed through a speed servo loop.

The switching circuit 125 is supplied with the residual track number signal 111 of the track count circuit 109 to detect that the residual track number for the seek operation is equal to zero, and on the basis of the detection result switches an input source to the driver amplifier 126 from the differential amplifier 116 to a tracking servo circuit 128. The tracking servo circuit 128 comprises a circuit for performing a phase-compensation and gain-adjustment, and is one of the constituents for the tracking servo loop. Accordingly, the tracking servo circuit 128 is used in combination with the other constituents such as the driver amplifier 126, the head actuator 127, the optical head 104 and the tracking error signal detection circuit 105 to accurately move the optical head 104 to a desired track on the optical recording medium 100.

As described above, the moving speed of the optical head 104 is determined by a time interval for the track-traverse motion of the optical head 104 over each track, and thus hereinafter "speed" means a relative speed between the optical head 104 and a current track to be currently traversed.

However, the conventional speed control device for the optical head as described above has the following disadvantages. That is, the conventional device is so designed that a track-traverse motion is detected on the basis of a pass of the tracking error signal 106 over the zero-cross point thereof and a reference speed signal 115 assigned to a residual track number is produced and outputted by the reference-speed conversion ROM 112 using only the track traverse signal 108 which is produced in accordance with the passage of the tracking error signal 106 over the zero-cross point. Therefore, the reference speed signal 115 outputted from the reference-speed conversion ROM 112 varies stepwisely as shown in FIG. 14(e). In order to perform a seek operation at high speed, it is ideally preferable that accelerating and decelerating operations of the optical head are carried out in uniformly accelerating and decelerating modes (motions) respectively, that is, a speed variation with time is constant as shown in FIG. 14(f). However, when the reference speed signal 115 varies stepwisely as described above, it is difficult to perform the accelerating and decelerating operations at the uniformly accelerating and decelerating modes, and particularly a difference between the stepwisely-variable reference speed signal 113 and a speed to be actually controlled is larger at a low speed range. Therefore, the head actuator 127 for driving the optical head 104 can not be uniformly decelerated in the seek operation, and thus the driving of the actuator 127 is delayed with respect to that in an ideal decelerating operation (that is, an uniformly-decelerating operation). This delay of the head actuator 127 (or the deviation of the actual decelerating operation from the ideal decelerating operation) causes the seeking operation to be remarkably deteriorated.

Accordingly, the actual speed variation of the optical head is made with delay or deviation from the ideal speed variation at the uniformly-decelerating mode in the low speed range as show in FIG. 14(f), and in addition is vibrated when a loop gain is high. As a result, there occurs a case where even if the reference speed signal 113 is set to zero at a track just preceding to the desired (destination) track (a track whose residual track number is 1) as shown by (i) of FIG. 14(f), the moving speed of the optical head which has just traversed the center of the desired track is larger than the maximum moving speed of the optical head below which the optical head can be subjected to a tracking servo operation to accurately pull or seek the optical head onto the desired track (hereinafter referred to as "a seekable speed").

In this case, even though a switching or selecting operation of switching to or selecting the tracking servo circuit 128 is carried out by the switching circuit 125 at a time point of (i) of FIG. 14(f), the optical head can not be pulled onto the desired track, but overruns the desired track as shown by (j) of FIG. 14(f). In addition, even in a case where a residual speed at the instantaneous time when the tracking servo operation is selected by the switching circuit 125 is slightly larger than the seekable speed at which the optical head can be surely subjected to the tracking servo operation (that is, the optical head can be surely pulled onto the desired track) as shown by (h) of FIG. 14, positive and negative feedbacks which are ordinarily used to perform the seeking operation are countervailed because they are alternately carried out every half period of the tracking error signal, so that these feedbacks do not contribute to a decelerating operation of the optical head. Therefore, the overrunning of the optical head is continued until the residual speed is decelerated down to the seekable speed at which the optical head can be surely pulled onto the desired track as shown by (h) of FIG. 14, and thus a seek error indicating an overrunning of several or more tracks occurs.

In order to overcome the above disadvantage, the following two techniques have been conventionally adopted in the conventional speed control devices for the optical head. One is a technique that variation of the reference speed signal in the low speed range is set to a small value to restrict a control band (range) for the speed-servo operation, and the optical head is slowly approached to the desired track. The other is a two-step access technique that a concise speed control in the low speed range is intentionally abandoned, however, a rough seek operation of roughly moving the optical head near to the desired track is once carried out and then a concise seek operation of accurately approaching the optical head to the desired track is carried out.

The former has the following new disadvantages. A long time is required to perform a speed control in the low speed range because the variation of the reference speed signal in the low speed range is set to a small value, and in addition it is impossible to carry out a uniformly-decelerating speed control. Likewise, the latter has the following new disadvantages. Since the two-step speed control operation including rough and concise seek operations is required, the control device is complicated in construction and high in cost. In addition, a long time is required to perform the speed control.

In order to overcome the above disadvantages, there has been proposed a brake pulse supply technique in which just immediately before the seek operation is finished, the speed control is opened and a brake pulse is supplied to rapidly reduce the moving speed of an optical beam (optical head). This technique is disclosed in "National Technical Report", Vo. 35, No. 2, pp 67-73, April 1989.

As shown in FIG. 22, in this brake pulse supply technique, the optical beam is moved in a closed-loop speed control mode until the optical beam reaches a prescribed point X, and moved in an open-loop speed control mode after the optical beam exceeds the point X. When the optical beam arrives at the point X, a CPU calculates a current position of the optical beam on the basis of the period of a track(groove)-traverse signal just before the point X, and calculates such pulse height and pulse width that the speed of the optical beam at a desired track position Z to be sought is equal to a predetermined speed. Signals representing the pulse height and pulse width thus calculated are supplied to the actuator to forcibly stop the optical beam on the desired track and then starting the tracking servo control operation. As a result, this technique enables a seek time to be shortened.

However, this brake pulse supply technique carries out, in the open loop mode, the speed control just before the completion of the seek operation, and therefore in consideration of a speed variation or the like due to disturbance, the moving speed of the optical beam can not be necessarily decelerated to the desired speed at a time when the brake pulse is supplied, and this failure of the deceleration of the moving speed would induce occurrence of a seek error. In order to overcome this disadvantage, it seems indispensable to utilize in combination a learning control technique or the like in which a correlation between the moving speeds of the optical beam at the instantaneous time when the brake pulse is supplied and the moving speed of the optical head after the brake pulse is supplied is learned and the pulse height (peak-to-peak value) and pulse width of the brake pulse are controlled by the CPU. However, like the conventional techniques as described above, this technique also has the following disadvantages. That is, the construction of the control system is more complicated, and other techniques such as a concise seek technique and so on must be used if the learning control technique is not adopted.

SUMMARY OF THE INVENTION

In order to overcome the above disadvantages of the prior art, an object of this invention is to provide a method for controlling the moving speed of an optical head and a device using the same in which the decelerating of the optical head are carried out at high speed with an uniform deceleration, and which has an excellent seeking characteristic and is capable of performing a speed control operation with sufficient accuracy in simple construction.

According to the claim 1, in a speed control method for an optical head for optically performing an information recording or reproducing operation on or from an optical recording medium, including the steps of detecting a track-traverse motion of the optical head which traverses a track on the optical recording medium to obtain the number of residual tracks to a desired track on the basis of the tracks over which the optical head has passed, generating a reference speed signal for moving the optical head in accordance with the residual track number, and detecting a moving speed of the optical head to generate a speed detection signal, thereby performing a speed control of a seek operation of the optical head using a feedback of a different signal between the reference speed signal and the speed detection signal, the method further comprises the steps of, in a speed control of a seek operation of the optical head using the feedback of the difference signal between the reference speed signal and the speed detection signal, switching the reference speed signal to a ground level when the residual track number is reduced below a predetermined value, and pulling the optical head into a tracking servo operation when a predetermined period has elapsed since the switch of the reference speed signal to the ground level.

According to the claim 2, in a speed control device for an optical head including an optical head for perform an information recording or reproducing operation on or from an optical recording medium, optical head moving means for moving the optical head in a traverse direction to tracks on the optical recording medium, tracking error signal detection means for detecting a tracking error signal from a laser beam outputted from the optical head, track traverse detection means for a track-traverse motion of the optical head based on the tracking error signal from the tracking error signal detection means, track counting means for counting the number of residual tracks to a desired track to which the optical head is moved on the basis of the track traverse signal from the track traverse detection means, reference speed signal generating means for a reference speed signal proportional to a reference speed which is beforehand set in accordance with a signal indicative of the residual track number outputted from the track counting means, optical head moving speed detection means for detecting a moving speed of the optical head on the basis of the track traverse signal outputted from the track traverse detection means to output a speed detection signal, differential amplifying means for amplifying a difference between the reference speed signal and the speed detection signal, and driving means for driving the optical head moving means through a feedback of a difference signal outputted from the differential amplifying means, the device further comprises first switching means for switching the reference speed signal to a ground level as an input source to the differential amplifying means, second switching means for switching the difference signal of the differential amplifying means to a tracking servo signal as a feedback source to the driving means, and timing signal generating means for, in a speed control of a seek operation of the optical head using the feedback of the difference signal between the reference speed signal and the speed detection signal, generating a first timing signal for driving said first switching means to switch to the ground level when the residual track number is below a predetermined value and generating a second timing signal for driving the second switching means to switch to the tracking servo signal when a predetermined time interval has elapsed since the output of the first timing signal.

According to the claim 3, in a speed control method for an optical head for optically performing an information recording or reproducing operation on or from an optical recording medium, including the steps of detecting a track-traverse motion of the optical head which traverses a track on the optical recording medium to obtain the number of residual tracks to a desired track on the basis of the tracks over which the optical head has passed, generating a reference speed signal for moving the optical head in accordance with the residual track number, and detecting a moving speed of the optical head to generate a speed detection signal, thereby performing a speed control of a seek operation of the optical head using a feedback of a different signal between the reference speed signal and the speed detection signal, the method further comprises the steps of, in a speed control of a seek operation of the optical head using the feedback of the difference signal between the reference speed signal and the speed detection signal, switching the reference speed signal to a ground level when the residual track number is reduced below a predetermined value, and then pulling the optical head into a tracking servo operation when the speed detection signal is below a predetermined value.

According to the claim 4, in a speed control device for an optical head including an optical head for perform an information recording or reproducing operation on or from an optical recording medium, optical head moving means for moving the optical head in a traverse direction to tracks on the optical recording medium, tracking error signal detection means for detecting a tracking error signal from a laser beam outputted from the optical head, track traverse detection means for a track-traverse motion of the optical head based on the tracking error signal from the tracking error signal detection means, track counting means for counting the number of residual tracks to a desired track to which the optical head is moved on the basis of the track traverse signal from the track traverse detection means, reference speed signal generating means for a reference speed signal proportional to a reference speed which is beforehand set in accordance with a signal indicative of the residual track number outputted from the track counting means, optical head moving speed detection means for detecting a moving speed of the optical head on the basis of the track traverse signal outputted from the track traverse detection means to output a speed detection signal, differential amplifying means for amplifying a difference between the reference speed signal and the speed detection signal, and driving means for driving the optical head moving means through a feedback of a difference signal outputted from the differential amplifying means, the device further comprises first switching means for switching the reference speed signal to a ground level as an input source to the differential amplifying means, second switching means for switching the difference signal of the differential amplifying means to a tracking servo signal as a feedback source to the driving means, timing signal generating means for, in a speed control of a seek operation of the optical head using the feedback of the difference signal between the reference speed signal and the speed detection signal, generating a first timing signal for driving said first switching means to switch to the ground level when the residual track number is below a predetermined value and generating a second timing signal for driving the second switching means to switch to the tracking servo signal when the speed detection signal is below a predetermined value.

According to the claim 5, in a speed control method for an optical head for optically performing an information recording or reproducing operation on or from an optical recording medium, including the steps of detecting a track-traverse motion of the optical head which traverses a track on the optical recording medium to obtain the number of residual tracks to a desired track on the basis of the tracks over which the optical head has passed, generating a reference speed signal for moving the optical head in accordance with the residual track number, and detecting a moving speed of the optical head to generate a speed detection signal, thereby performing a speed control of a seek operation of the optical head using a feedback of a different signal between the reference speed signal and the speed detection signal, the method further comprises the steps of, in a speed control of a seek operation of the optical head using the feedback of the difference signal between the reference speed signal and the speed detection signal, switching the reference speed signal to a ground level when the residual track number is reduced below a predetermined value, and pulling the optical head into a tracking servo operation when a predetermined period has elapsed since the switch of the reference speed signal to the ground level and controlling the predetermined time interval and a gain for the feedback of the difference signal between the reference signal and the speed detection signal in accordance with the moving speed of the optical head.

According to the claim 6, in a speed control device for an optical head including an optical head for perform an information recording or reproducing operation on or from an optical recording medium, optical head moving means for moving the optical head in a traverse direction to tracks on the optical recording medium, tracking error signal detection means for detecting a tracking error signal from a laser beam outputted from the optical head, track traverse detection means for a track-traverse motion of the optical head based on the tracking error signal from the tracking error signal detection means, track counting means for counting the number of residual tracks to a desired track to which the optical head is moved on the basis of the track traverse signal from the track traverse detection means, reference speed signal generating means for a reference speed signal proportional to a reference speed which is beforehand set in accordance with a signal indicative of the residual track number outputted from the track counting means, optical head moving speed detection means for detecting a moving speed of the optical head on the basis of the track traverse signal outputted from the track traverse detection means to output a speed detection signal, differential amplifying means for amplifying a difference between the reference speed signal and the speed detection signal, and driving means for driving the optical head moving means through a feedback of a difference signal outputted from the differential amplifying means, the device further comprises first switching means for switching the reference speed signal to a ground level as an input source to the differential amplifying means, second switching means for switching the difference signal of the differential amplifying means to a tracking servo signal as a feedback source to the driving means, and timing signal generating and gain controlling means for, in a speed control of a seek operation of the optical head using the feedback of the difference signal between the reference speed signal and the speed detection signal, generating a first timing signal for driving said first switching means to switch to the ground level when the residual track number is below a predetermined value and a second timing signal for driving the second switching means to switch to the tracking servo signal when a predetermined time interval has elapsed since the output of the first timing signal, and controlling the predetermined time interval and a gain for the feedback of the difference between the reference speed signal and the speed detection signal in accordance with the moving speed of the optical head.

According to the claim 7, in a speed control method for an optical head for optically performing an information recording or reproducing operation on or from an optical recording medium, including the steps of detecting a track-traverse motion of the optical head which traverses a track on the optical recording medium to obtain the number of residual tracks to a desired track on the basis of the tracks over which the optical head has passed, generating a reference speed signal for moving the optical head in accordance with the residual track number, and detecting a moving speed of the optical head to generate a speed detection signal, thereby performing a speed control of a seek operation of the optical head using a feedback of a different signal between the reference speed signal and the speed detection signal, the method further comprises the steps of, in a speed control of a seek operation of the optical head using the feedback of the difference signal between the reference speed signal and the speed detection signal, switching the reference speed signal to a ground level when the residual track number is reduced below a predetermined value, and pulling the optical head into a tracking servo operation after a predetermined period has elapsed since the switch of the reference speed signal to the ground level and when the optical head passes over a predetermined track position.

According to the claim 8, in a speed control device for an optical head including an optical head for perform an information recording or reproducing operation on or from an optical recording medium, optical head moving means for moving the optical head in a traverse direction to tracks on the optical recording medium, tracking error signal detection means for detecting a tracking error signal from a laser beam outputted from the optical head, track traverse detection means for a track-traverse motion of the optical head based on the tracking error signal from the tracking error signal detection means, track counting means for counting the number of residual tracks to a desired track to which the optical head is moved on the basis of the track traverse signal from the track traverse detection means, reference speed signal generating means for a reference speed signal proportional to a reference speed which is beforehand set in accordance with a signal indicative of the residual track number outputted from the track counting means, optical head moving speed detection means for detecting a moving speed of the optical head on the basis of the track traverse signal outputted from the track traverse detection means to output a speed detection signal, differential amplifying means for amplifying a difference between the reference speed signal and the speed detection signal, and driving means for driving the optical head moving means through a feedback of a difference signal outputted from the differential amplifying means, the device further comprises first switching means for switching the reference speed signal to a ground level as an input source to the differential amplifying means, second switching means for switching the difference signal of the differential amplifying means to a tracking servo signal as a feedback source to the driving means, and timing signal generating means for, in a speed control of a seek operation of the optical head using the feedback of the difference signal between the reference speed signal and the speed detection signal, generating a first timing signal for driving said first switching means to switch to the ground level when the residual track number is below a predetermined value and generating a second timing signal for driving the second switching means to switch to the tracking servo signal after a predetermined time interval has elapsed since the output of the first timing signal and when the optical head passes over a predetermined track position.

According to the claim 9, in a speed control method for an optical head for optically performing an information recording or reproducing operation on or from an optical recording medium, including the steps of detecting a track-traverse motion of the optical head which traverses a track on the optical recording medium to obtain the number of residual tracks to a desired track on the basis of the tracks over which the optical head has passed, generating a reference speed signal for moving the optical head in accordance with the residual track number, and detecting a moving speed of the optical head to generate a speed detection signal, thereby performing a speed control of a seek operation of the optical head using a feedback of a different signal between the reference speed signal and the speed detection signal, the method further comprises the steps of, in a speed control of a seek operation of the optical head using the feedback of the difference signal between the reference speed signal and the speed detection signal, switching the reference speed signal to a ground level when the residual track number is reduced below a predetermined value, and then pulling the optical head into a tracking servo operation when the speed detection signal is below a predetermined value and the optical head passes over a predetermined track position.

According to the claim 10, in a speed control device for an optical head including an optical head for perform an information recording or reproducing operation on or from an optical recording medium, optical head moving means for moving the optical head in a traverse direction to tracks on the optical recording medium, tracking error signal detection means for detecting a tracking error signal from a laser beam outputted from the optical head, track traverse detection means for a track-traverse motion of the optical head based on the tracking error signal from the tracking error signal detection means, track counting means for counting the number of residual tracks to a desired track to which the optical head is moved on the basis of the track traverse signal from the track traverse detection means, reference speed signal generating means for a reference speed signal proportional to a reference speed which is beforehand set in accordance with a signal indicative of the residual track number outputted from the track counting means, optical head moving speed detection means for detecting a moving speed of the optical head on the basis of the track traverse signal outputted from the track traverse detection means to output a speed detection signal, differential amplifying means for amplifying a difference between the reference speed signal and the speed detection signal, and driving means for driving the optical head moving means through a feedback of a difference signal outputted from the differential amplifying means, the device further comprises first switching means for switching the reference speed signal to a ground level as an input source to the differential amplifying means, second switching means for switching the difference signal of the differential amplifying means to a tracking servo signal as a feedback source to the driving means, and timing signal generating means for, in a speed control of a seek operation of the optical head using the feedback of the difference signal between the reference speed signal and the speed detection signal, generating a first timing signal for driving said first switching means to switch to the ground level when the residual track number is below a predetermined value and generating a second timing signal for driving the second switching means to switch to the tracking servo signal when the speed detection signal is below a predetermined value, and the optical head passes over a predetermined track position.

According to the claim 11, in a speed control method for an optical head for optically performing an information recording or reproducing operation on or from an optical recording medium, including the steps of detecting a track-traverse motion of the optical head which traverses a track on the optical recording medium to obtain the number of residual tracks to a desired track on the basis of the tracks over which the optical head has passed, generating a reference speed signal for moving the optical head in accordance with the residual track number, and detecting a moving speed of the optical head to generate a speed detection signal, thereby performing a speed control of a seek operation of the optical head using a feedback of a different signal between the reference speed signal and the speed detection signal, the method further comprises the steps of, in a speed control of a seek operation of the optical head using the feedback of the difference signal between the reference speed signal and the speed detection signal, switching the reference speed signal to a ground level when the residual track number is reduced below a predetermined value, and then pulling the optical head into a tracking servo operation when the speed detection signal is below a predetermined value and the residual track number reaches a predetermined value.

According to the claim 12, in a speed control device for an optical head including an optical head for perform an information recording or reproducing operation on or from an optical recording medium, optical head moving means for moving the optical head in a traverse direction to tracks on the optical recording medium, tracking error signal detection means for detecting a tracking error signal from a laser beam outputted from the optical head, track traverse detection means for a track-traverse motion of the optical head based on the tracking error signal from the tracking error signal detection means, track counting means for counting the number of residual tracks to a desired track to which the optical head is moved on the basis of the track traverse signal from the track traverse detection means, reference speed signal generating means for a reference speed signal proportional to a reference speed which is beforehand set in accordance with a signal indicative of the residual track number outputted from the track counting means, optical head moving speed detection means for detecting a moving speed of the optical head on the basis of the track traverse signal outputted from the track traverse detection means to output a speed detection signal, differential amplifying means for amplifying a difference between the reference speed signal and the speed detection signal, and driving means for driving the optical head moving means through a feedback of a difference signal outputted from the differential amplifying means, the device further comprises first switching means for switching the reference speed signal to a ground level as an input source to the differential amplifying means, second switching means for switching the difference signal of the differential amplifying means to a tracking servo signal as a feedback source to the driving means, and timing signal generating means for, in a speed control of a seek operation of the optical head using the feedback of the difference signal between the reference speed signal and the speed detection signal, generating a first timing signal for driving said first switching means to switch to the ground level when the residual track number is below a predetermined value and generating a second timing signal for driving the second switching means to switch to the tracking servo signal when the speed detection signal is below a predetermined value, and the residual track number reaches a predetermined value.

This invention includes as a constituent element the switching operation of switching the reference speed signal to the ground level when the residual track number is below the predetermined value. Here, "the switching operation of switching the reference speed signal to the ground level" includes not only an operation of keeping the reference speed signal at the ground level (zero level) as literally described, but also an operation of keeping the reference speed signal at a level near to the ground level (zero level) because this switching operation is used to decelerate the optical head to stop it to the desired track, as is apparent from the subject matter of this invention.

According to the invention as claimed in the claim 1, in the speed control of the seek operation for the optical head using the feedback of the difference signal between the reference speed signal and the speed detection signal, the reference speed signal is switched to the ground level when the residual track number is reduced below the predetermined value, thereby continuing the decelerating operation of the optical head. After the predetermined time interval is elapsed since the switching operation from the reference speed signal to the ground level, the optical head is pulled into the tracking servo operation, so that the pulling of the optical head into the tracking servo operation is carried out in a state where the optical head is decelerated below the speed at which the optical head can be surely pulled in the tracking servo operation. Accordingly, even when the residual track number is below the predetermined value, the decelerating operation of the optical head is continued, and thus the optical head is substantially uniformly decelerated. As a result, the seek operation can be surely carried out at a high speed, and in addition occurrence of a large error in the seek operation can be prevented because the optical head is surely decelerated when the optical head is subjected to the tracking servo operation at a predetermined timing. Further, the two-step speed control including the rough and concise seek operations are not required, and thus complication in construction and extension in time required for the seek operation are prevented. This enables the seek operation to be carried out at a high speed.

According to the invention as claimed in the claim 2, in the speed control of the seek operation for the optical head using the feedback of the difference signal between the reference speed signal and the speed detection signal, the first timing signal is outputted from the timing signal generating means when the residual track number is below the predetermined value to drive the first switching circuit to switch to the ground level, and after the predetermined time interval is elapsed since the output of the first timing signal, the second timing signal is outputted from the timing signal generating circuit to drive the second switching circuit to switch the difference signal from the differential amplifying means to the tracking servo signal. Therefore, like the invention as claimed in the claim 1, the decelerating operation of the optical head is continued by switching the reference speed signal to the ground level when the residual track number is below the predetermined value, so that the optical head can be uniformly decelerated and the seek operation can be carried out at a high speed. In addition, since it is sufficient to merely pull the optical head into the tracking servo operation at the predetermined timing and the two-step speed control operation is not required, complication in construction and extension in time required for the seek operation are not prevented. This enables the seek operation to be carried out at a high speed.

According to the invention as claimed in the claim 3, in the speed control of the seek operation for the optical head using the feedback of the difference signal between the reference speed signal and the speed detection signal, the reference speed signal is switched to the ground level when the residual track number is reduced below the predetermined value, and thereafter the optical head is pulled into the tracking servo operation when the speed detection signal is reduced below the predetermined value. Therefore, the decelerating operation of the optical head is continued when the residual track number is reduced below the predetermined value, so that the optical head can be uniformly decelerated and the seek operation can be carried out at a high speed. In addition, since the pulling of the optical head into the tracking servo operation is carried out when the speed detection signal is reduced below the predetermined value, the optical head can be surely pulled into the tracking servo operation with assurance that the moving speed of the optical head is reduced below the seekable speed at which the optical head can be pulled into the tracking servo operation, so that the seek operation can be carried out with high accuracy. Further, the two-step speed control operation is not required. As a result, complication in construction and extension in time required for the seek operation are prevented, and this enables the seek operation to be carried out at a high speed.

According to the invention as claimed in the claim 4, in the speed control of the seek operation for the optical head using the feedback of the difference signal between the reference speed signal and the speed detection signal, the first timing signal is outputted from the timing signal generating means when the residual track number is below the predetermined value to drive the first switching circuit to switch to the ground level, and after the speed detection signal is reduced below the predetermined value, the second timing signal is outputted from the timing signal generating circuit to drive the second switching circuit to switch the difference signal from the differential amplifying means to the tracking servo signal. Therefore, like the invention as claimed in the claim 3, the decelerating operation of the optical head is continued by switching the reference speed signal to the ground level when the residual track number is below the predetermined value, so that the optical head can be uniformly decelerated and the seek operation can be carried out at a high speed. In addition, the optical head is surely pulled into the tracking servo operation with assurance that the moving speed of the optical head is reduced below the seekable speed at which the optical head can be surely pulled into the tracking servo operation, and the two-step speed control operation is not required, complication in construction and extension in time required for the seek operation are not prevented. This enables the seek operation to be carried out at a high speed.

According to the invention as claimed in the claim 5, in the speed control of the seek operation for the optical head using the feedback of the difference signal between the reference speed signal and the speed detection signal, the reference speed signal is switched to the ground level when the residual track number is reduced below the predetermined value, and after the predetermined time interval is elapsed since the switching operation from the reference speed signal to the ground level, the optical head is pulled into the tracking servo operation and the predetermined time and a gain for the feedback of the difference signal between the reference speed signal and the speed detection signal are controlled in accordance with the moving speed of the optical head. Therefore, the decelerating operation of the optical head is continued by switching the reference speed signal to the ground level when the residual track number is reduced below the predetermined value, so that the optical head can be uniformly decelerated and the seek operation can be carried out at a high speed. In addition, since the predetermined time interval and the gain for the feedback of the difference signal between the reference speed signal and the speed detection signal are controlled in accordance with the moving speed of the optical head, the optical head can be reduced below the seekable speed by controlling the gain of the reference speed feedback even if the moving speed of the optical head is higher than the reference speed, so that the optical head can be surely pulled into the tracking servo operation. Further, the two-step speed control including the rough and concise seek operations are not required, and thus complication in construction and extension in time required for the seek operation are prevented. This enables the seek operation to be carried out at a high speed.

According to the invention as claimed in the claim 6, in the speed control of the seek operation for the optical head using the feedback of the difference signal between the reference speed signal and the speed detection signal, the first timing signal is outputted from the timing signal generating means when the residual track number is below the predetermined value to drive the first switching circuit to switch to the ground level, and after the predetermined time interval is elapsed since the output of the first timing signal, the second timing signal is outputted from the timing signal generating and gain controlling means to drive the second switching circuit to switch the difference signal from the differential amplifying means to the tracking servo signal. In addition, since the predetermined time interval and the gain for the feedback of the difference signal between the reference speed signal and the speed detection signal are controlled in accordance with the moving speed of the optical head by the timing signal generating and gain controlling means, the optical head can be reduced below the seekable speed by controlling the gain of the reference speed feedback even if the moving speed of the optical head is higher than the reference speed, so that the optical head can be surely pulled into the tracking servo operation. Further, the two-step speed control operation is not required, complication in construction and extension in time required for the seek operation are not prevented. This enables the seek operation to be carried out at a high speed.

According to the invention as claimed in the claim 7, in the speed control of the seek operation for the optical head using the feedback of the difference signal between the reference speed signal and the speed detection signal, the reference speed signal is switched to the ground level when the residual track number is reduced below the predetermined value. After the predetermined time interval is elapsed since the switching operation from the reference speed signal to the ground level and when the optical head passes over the predetermined track position, the optical head is pulled into the tracking servo operation. Therefore, the decelerating operation of the optical head is counted when the residual track number is reduced below the predetermined value, so that the optical head can be uniformly decelerated and the seek operation can be carried out at a high speed. In addition, since the pulling of the optical head into the tracking servo operation is carried out when the speed detection signal is below the predetermined value and the optical head passes over the predetermined track position, the optical head can be surely pulled into the tracking servo operation with assurance that the moving speed of the optical head is reduced below the seekable speed at which the optical head can be pulled into the tracking servo operation, so that the seek operation can be carried out with high accuracy. Further, the two-step speed control operation is not required. As a result, complication in construction and extension in time required for the seek operation are prevented, and this enables the seek operation to be carried out at a high speed. Still further, since the pulling of the optical head into the tracking servo operation is carried out when the optical head passes over the predetermined track position, the optical head can be surely pulled onto the desired track even if the residual speed is despersed.

The invention as claimed in the claim 8 provides a speed control device for an optical head which realizes the speed control method for the optical head as claimed in the claim 7.

According to the invention as claimed in the claim 9, in the speed control of the seek operation for the optical head using the feedback of the difference signal between the reference speed signal and the speed detection signal, the reference speed signal is switched to the ground level when the residual track number is reduced below the predetermined value, and thereafter the second timing signal for driving the second switching means to switch to the tracking servo signal is outputted from the timing generating means when the speed detection signal is reduced below the predetermined value and the optical head passes over the predetermined track position. Therefore, in addition to the effect which is obtained by the invention as claimed in the claim 3, the following effect can be obtained. That is, the optical head can be accurately pulled onto the desired track irrespective of the dispersion of the residual speed.

The invention as claimed in the claim 10 provides a speed control device for an optical head which realizes the speed control method for the optical head as claimed in the claim 9.

According to the invention as claimed in the claim 11, in the speed control of the seek operation for the optical head using the feedback of the difference signal between the reference speed signal and the speed detection signal, the first switching signal for driving the first switching means to switch to the ground level is outputted from the timing signal generating means when the residual track number is reduced below the predetermined value, and the second timing signal from driving the second switching means to switch to the tracking servo signal is outputted from the timing signal generating means when the speed detection signal is below the predetermined value and the residual track number reaches to the predetermined value. Accordingly, like the invention as claimed in the claim 9, in addition to the effect obtained by the invention as claimed in the claim 3, an effect that the optical head can be accurately pulled onto the desired track irrespective of the dispersion of the residual speed.

The invention as claimed in the claim 12 provides a speed control device for an optical head which realizes the speed control method for the optical head as claimed in the claim 11.

BRIEF DESCRIPTION OF THE DRAWINGS

FIG. 5 show respective time charts for showing an operation of the embodiment;

FIG. 22 is a timing chart for showing an operation of another conventional speed control device for an optical head.

DETAILED DESCRIPTION OF THE INVENTION

Preferred embodiments of this invention will be hereunder described with reference to the accompanying drawings.

Figure 2:
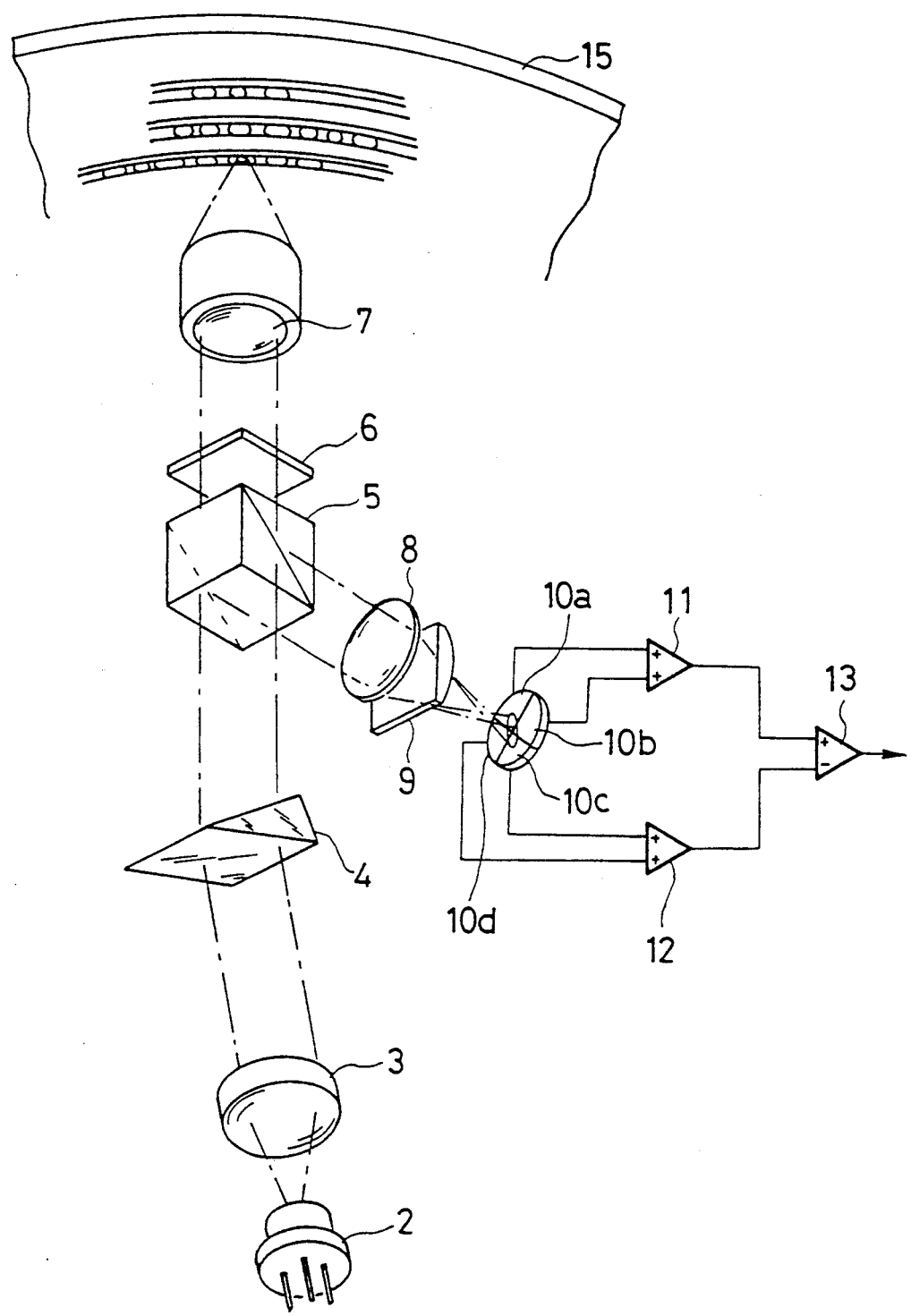
FIG. 2 is a schematic view of showing the construction of an optical information recording and reproducing apparatus to which the speed control device according to this invention is applied.

FIG. 2 shows an embodiment of an optical information recording and reproducing apparatus to which speed control method and device for an optical head according to this invention are applied.

As shown in FIG. 2, the optical information recording and reproducing apparatus 1 includes a semiconductor laser 2 for emitting a laser beam having an elliptical sectional shape, a collimator lens 3 for collimating the laser beam emitted from the semiconductor laser 2, a beam shaping prism 4 for shaping the collimated laser beam into a laser beam having a circular sectional shape, a beam splitter 5 for dividing the laser beam, a quarter wavelength plate 6 for converting one of linearly-polarized and circularly-polarized beams to the other, an objective lens 7, a converging lens 8 for converging the beam divided by the beam splitter 5, a cylindrical lens 9, and a four-segmented photodetector 10 including four photodetector elements 10a, 10b, 10c and 10d.

As shown in FIG. 2, two pairs of the photodetector elements 10a, 10b, 10c and 10d of the four-segmented photodetector 10 are connected to add-amplifiers 11 and 12 respectively, and the respective outputs of the ad-amplifiers 11 and 12 are input to the inverse and non-inverse terminals of a differential amplifier 13 for outputting a tracking error signal. This arrangement of these elements is well known in the art.

Figure 3:
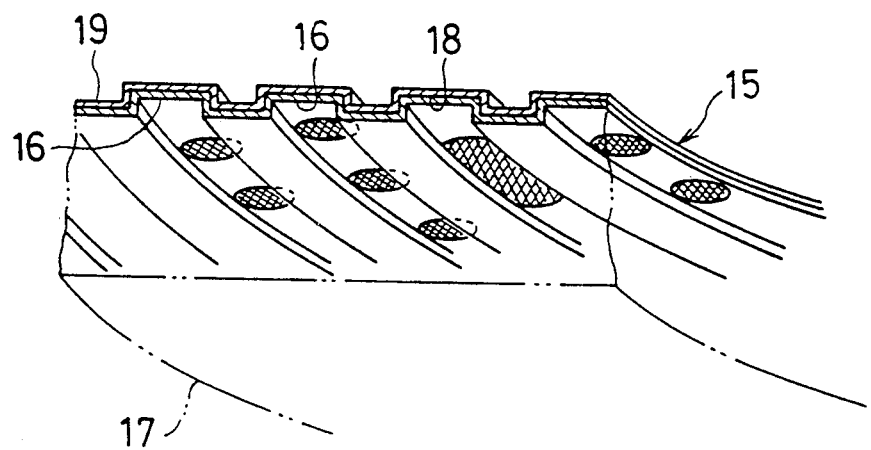
FIG. 3 is a schematic view of an optical disk.

As shown in FIG. 3, an optical disk serving as an optical recording medium on or from which an information is recorded or reproduced by the optical information recording and reproducing apparatus as described above, mainly comprises a transparent substrate 17 having tracks 16 formed at a predetermined track pitch thereon, a recordable layer which is wholly provided over the surface of the transparent substrate 17 and on which information is recorded, and a protection layer 19 which is provided over the surface of the recordable layer 18.

In the optical information recording and reproducing apparatus 1 as shown in FIG. 2, a laser beam of elliptical sectional shape which has been emitted from the semiconductor laser 2 is collimated by the collimator lens 3, and then the collimated beams is shaped into a laser beam of circular sectional shape by the beam shaping prism 4. Thereafter, the laser beam of circular sectional shape is passed through the beam splitter 5 and the quarter wavelength plate 6 to the objective lens 7, and is convergently irradiated onto the surface of the optical disk 15 by the objective lens 7.

A beam reflected from the optical disk 15 is returned along the same optical path as described above, and further reflected from the beam splitter 5 and focused on the four-segmented photodetector 10 by the converging lens 8 and the cylindrical lens 9. Thereafter, in the same manner as described above, a tracking error signal is outputted from the differential amplifier 13 which is connected to the four-segmented photodetector 10.

Of the above elements, only the objective lens 7 as described above and a mirror (not shown) for altering an optical path are mounted on an optical head for scanning the optical disk 15 with the laser beam. The other elements are secured to a body of the apparatus, but elements other than described above may be mounted on the optical head as occasion demands.

Figure 1:
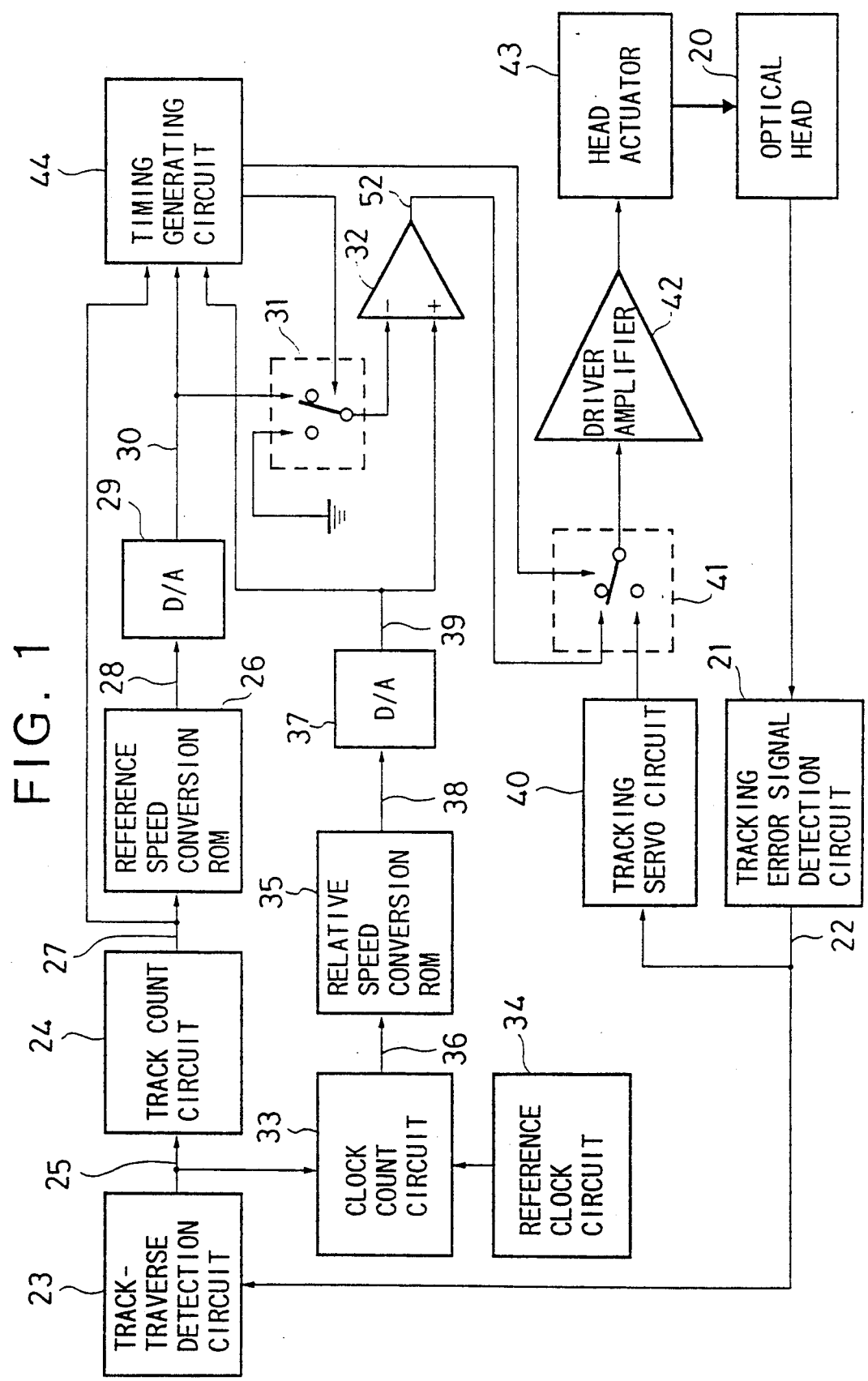
FIG. 1 is a block diagram for a first embodiment of a speed control apparatus for an optical head according to this invention.

FIG. 1 is a circuit diagram of a first embodiment of a speed control device for an optical head according to this invention.

In FIG. 1, a reference numeral 21 represents a tracking error signal detection circuit for converting the laser beam from the optical head 20 into an electrical signal to detect a tracking error. The tracking error signal detection circuit comprises the four-segmented photodetector 10 as described above, the add-amplifiers 11 and 12 connected to the four-segmented photodetector 10, and the differential amplifier 13, and outputs a tracking error signal 22 in response to the detection of the tracking error.

A reference numeral 23 represents a track-traverse detection circuit for detecting a traverse motion of the optical head 20 over a track (hereinafter referred to as "track-traverse motion") on the basis of the tracking error signal 22 to output a track-traverse signal 25 every track-traverse motion, and a reference numeral 24 represents a track count circuit for detecting edges of the track-traverse signal 25 outputted from the track-traverse detection signal 23 to count the number of the edges (edge pulses) of the track traverse signal 25 and calculating the number of residual tracks (residual track number) for a seek operation and to output a residual track number signal 27. Here, the "residual track number" is defined as the number of tracks between a track on which the optical head 20 is currently located and a desired track onto which the optical head 20 is finally pulled or sought.

A reference numeral 26 represents a reference speed conversion ROM for receiving the residual track number signal 27 indicative of the residual track number from the track count circuit 24 and outputting the digital signal 28 indicative of a reference speed assigned to (or corresponding to) the residual track number which is used as an address to a desired or destination track. The reference speed signal 28 is designed so as to perform a uniform (constant) accelerating and decelerating operations for the optical head. In this case, the reference speed conversion ROM is so constructed that the reference speed signal 28 is outputted from the reference speed conversion ROM 26 every movement from one track to another (or every track-traverse motion). A reference numeral 29 represents a D/A converter for converting the reference speed signal 28 outputted from the reference speed conversion ROM 26 to an analog signal 30, in which the analog signal 30 is subjected to a zero-order hold until a next edge (next edge pulse) of the track-traverse signal 25 is detected.

A reference numeral 31 represents a first switching circuit for performing a switching operation between an output terminal of the D/A converter 29 and a ground level terminal (that is, for selecting one of the output signal 30 of the D/A converter 29 and the ground level as an input source to a differential amplifier 32), and the reference numeral 32 represents a differential amplifier having one terminal (inverse terminal) to which one of the output terminal of the D/A converter 29 and the ground level terminal selected by the first switching circuit 31 is connected.

A reference numeral 33 represents a clock count circuit for receiving the track-traverse signal 25 outputted from the track-traverse detection circuit 23, and calculating a time interval between successive edges of the track-traverse signal 25 by counting the number of clocks which are outputted from a reference clock circuit 34 (that is, the time interval is represented by a count number of clocks from the reference clock circuit 34). A reference numeral 35 represents a relative speed conversion ROM for receiving the number of clocks (clock number) 36 for the time interval which is counted by the clock count circuit 33, and subjecting the counted clock number 36 to a inverse conversion with the clock number being used as an address to the desired track, thereby calculating a relative speed for the track traverse motion of the optical head 20 to the current track. A reference numeral 37 represents a D/A converter for converting a relative speed signal 38 indicating the current relative speed for the track traverse motion to an analog signal 39. The analog signal 39 of the reference speed signal 38 is input to the other terminal (non-inverse terminal) of the differential amplifier 32, in which the analog signal 39 is compared with the signal input to the inverse terminal of the differential amplifier 32.

A speed servo operation for the optical head 20 is performed by the elements as described above.

A reference numeral 40 represents a tracking servo circuit for performing a tracking servo operation in which the optical head 20 is accurately pulled or sought onto the desired track 16 on the optical disk 15, and comprises a circuit for performing phase-compensation and gain-adjustment functions as well known.

A reference numeral 41 represents a second switching circuit for performing a switching operation between an output terminal of the differential amplifier 32 and an output terminal of the tracking servo circuit 40 (that is, for selecting one of the outputs of the differential amplifier 52 and the tracking servo circuit). In other words, the second switching circuit carries out a servo-system switching operation between the speed servo system and the tracking servo system, and a timing generating circuit 44 as described below determines a timing for starting this switching operation. A reference numeral 42 represents a driver amplifier for driving a head actuator 43 which comprises a voice coil motor and so on for moving the optical head 43 in a traverse direction to the tracks. Further, the reference numeral 44 represents a timing generating circuit for generating a first timing signal for allowing the first switching circuit 31 to carry out the switching operation between the reference speed signal 30 and the ground level and a second timing signal for allowing the second switching circuit 41 to carry out the switching operation between the output signal of the differential amplifier 52 and the output signal of the tracking servo circuit 40.

Figure 4:
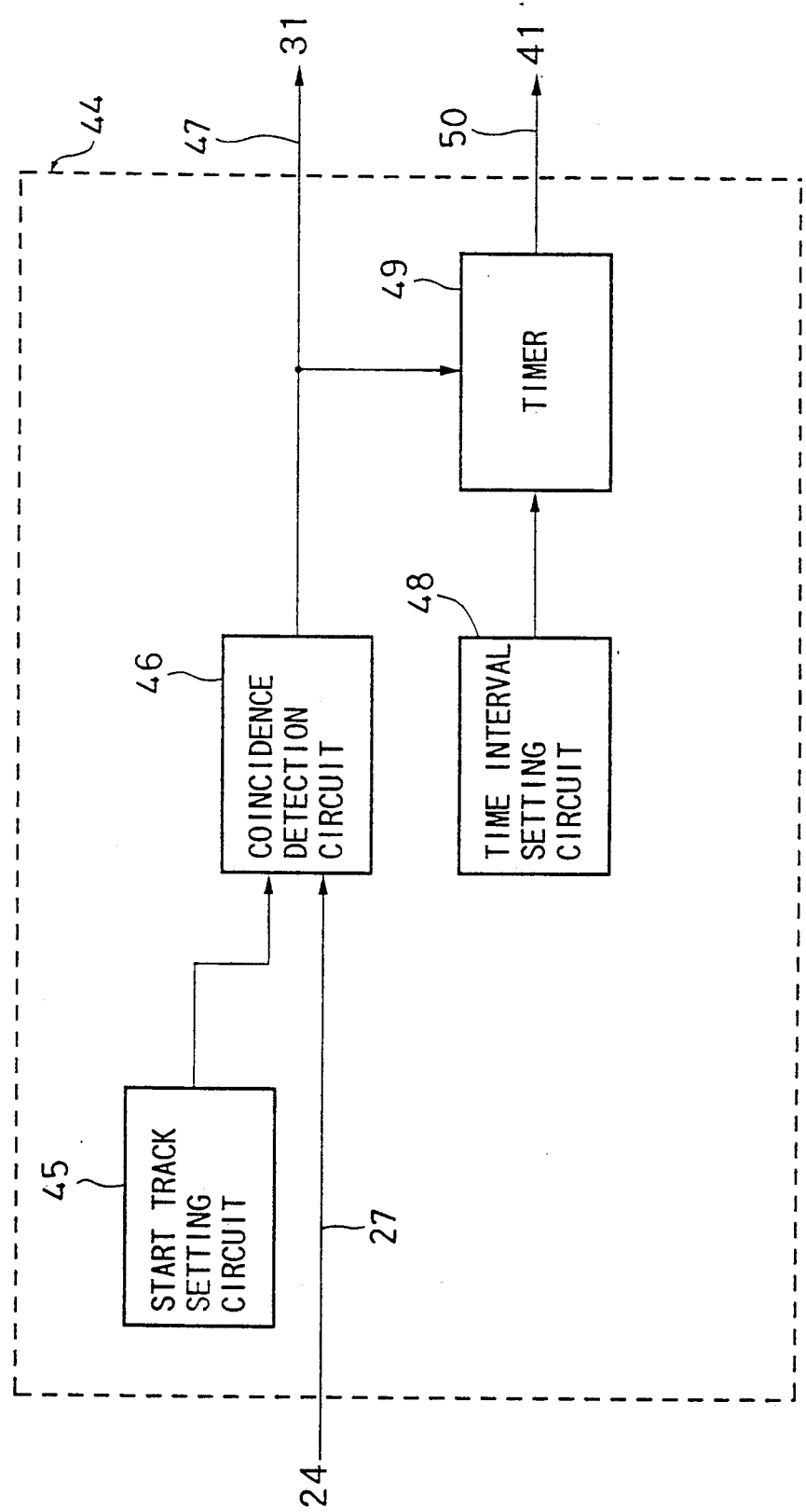
FIG. 4 is a block diagram for a timing generator.

FIG. 4 is a block diagram for showing the timing generating circuit as described above.

In FIG. 4, a reference numeral 45 represents a start track setting circuit for beforehand setting a prescribed value indicative of a residual track number to the desired track (hereinafter referred to as "a seek track number"), which serves to determine a first timing for starting the switching operation from the output signal of the D/A converter 29 to the ground level side as the input source to the differential amplifier 32 by the first switching circuit 31.

A reference numeral 46 represents a coincidence detection circuit for outputting a first timing signal 47 for starting the switching operation of switching the output signal of the D/A converter 29 to the ground level as an input source to the differential amplifier 32 (hereinafter referred to as "a first switching operation") when it is detected that the residual track number which is detected every track traverse motion and represented by the residual track number signal 27 of the track count circuit 24 is coincident with the seek track number which is beforehand set by the start track setting circuit 45.

A reference numeral 48 represents a time interval setting circuit for setting a time interval (T) from the instantaneous time when the first timing signal 47 is outputted from the coincidence detection circuit 46 till the instantaneous time when the second switching circuit 41 is driven to carry out the switching operation of switching the output terminal of the differential amplifier 32 to the output terminal of the tracking servo circuit 40 as an input source to the driver amplifier 42 (hereinafter referred to as "a second switching operation"). That is, the time interval setting circuit 48 serves to set or determine the time interval (T) between the times at which the first and second switching operations are carried out by the first and second switching circuits 31 and 41, respectively.

A reference numeral 49 represents a timer for outputting a second timing signal for driving the second switching circuit 41 to carry out the switching operation of switching the output terminal of the differential amplifier 32 to the output terminal of the tracking servo circuit 40 when clocking the lapse of the time interval (T) set by the time interval setting circuit 48 from the output of the first timing signal 47.

In this embodiment, the first timing for starting the first switching operation of the switching circuit 31 is set to the instantaneous time when the optical head 20 traverses a track just preceding to the desired track (that is, a track having a residual track number of 1), for example. However, the first timing is not limited to the above track, and may be set to another preceding track away from the desired track at a distance corresponding to 2 to 8 of track pitches.

A term "residual speed feedback" as described hereinafter means a feedback operation in which the switching circuit 31 is driven to carry out the first switching operation to keep one of the input terminals of the differential amplifier 32 to the ground level, and only the speed detection signal 39 is input to the other terminal of the differential amplifier 32 for the feedback.

As described above, the second timing for starting the second switching operation of the second switching circuit 41 is set by the time interval setting circuit 48. If a setting operation of determining the time interval (T) for the second timing is suitable, as shown in FIG. 5(f), the moving speed of the optical head 20 can be constantly reduced below the seekable speed at which the optical head 20 can be surely pulled or sought onto the desired track (that is, at which the tracking servo operation can be surely performed for the optical head 20) after the predetermined time is elapsed even if a speed at a starting time ((i) as shown in FIG. 5) of the residual speed feedback operation is dispersed or fluctuated. Therefore, at the instantaneous time when the moving speed of the optical head 20 is reduced below the seekable speed at which the tracking servo operation for the optical head 20 is enabled, a switching operation from the speed servo system to the tracking servo system can be carried out at all times, and the pulling or seeking of the optical head 20 onto the desired track can be stabilizingly performed.

Figure 6:
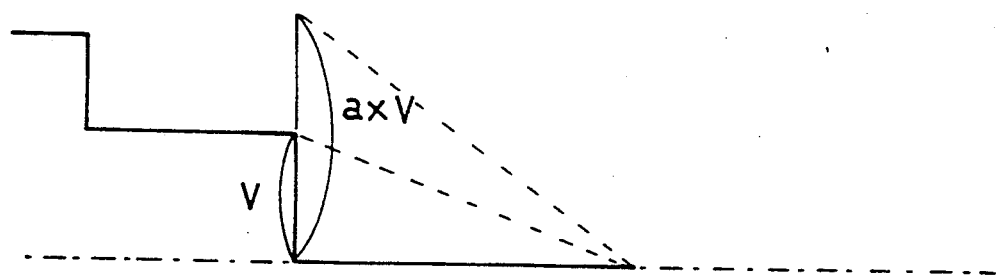
FIG. 6 is an explanatory diagram for showing the operation of the embodiment.

In the speed servo control operation using the feedback of the difference signal between the reference speed signal 28 and the speed detection signal 39 to the driver amplifier 42, for example, when the residual speed V of the optical head 20 on the last residual track (that is, the track just preceding to the desired track) is equal to the reference speed on the last residual track at a gain of the speed servo system as shown in FIG. 6 and at this time the switching circuit 31 is switched to the ground level to start the residual feedback operation, the speed of the optical head 20 on the desired track is assumed to be zero. In this case, if the residual speed V of the optical head 20 on the last residual track is a-th times as high as the reference speed, the deceleration rate of the optical head 20 after the residual feedback operation is also a-th times, so that though a time required for the speed of the optical head 20 to be zero is not varied, a distance at which the optical head 20 is moved for the time also is a-th times. That is, if the gain of the speed servo is constant, a period when the speed of the optical head 20 is reduced to the seekable speed at which the optical head 20 can be pulled onto the desired track is constant. Accordingly, if the period is set to a suitable value, the optical head 20 can be accurately pulled onto the desired track from a position within an area corresponding the dispersion or fluctuation of the residual speed at the time when the residual speed feedback is started.

Further, the margin (boundary) of the area (hereinafter referred to as "seekable area") on the optical recording medium where the optical head 20 can be pulled or sought onto the desired track, is determined by the level of a tracking error signal, and in this embodiment is set to a position away from the desired track by a plus or minus half pitch of the tracks. This indicates that if the position of the optical head 20 after the completion of the residual speed feedback, which is caused by the dispersion of the residual speed at the time when the residual speed feedback is started, is dispersed within the seekable area, the optical head 20 can be accurately pulled or sought onto the desired track. Further, even though the dispersion of the residual speed is larger, the tracking servo operation is started in a state where the optical head is accurately decelerated to the seekable speed at which it can be accurately pulled onto the desired track. Therefore, even when this method is adopted, a large overrunning as occurred in the prior art does not occurred in principle.

In the above embodiment, the determination of the residual track number used for determining the first timing and the time interval used for determining the second timing is made on the basis of the output of the track count circuit 24, however, this invention is not limited to the above manner. For example, the determination may be made on the basis of the analog reference speed signal 28 from the D/A converter 29 or the analog relative speed detection signal 39 from the D/A converter 37, and further these values may be suitably changed in accordance with variation of a driving force of the optical head 20 or disturbance due to inclination of the apparatus or the like. Moreover, parameters such as the residual track number and the time interval are beforehand learned on occasion and the determination of these values may be made by a prescribed calculation using the learned parameters. This calculation may be carried out by a microcomputer using a suitable program.

The following speed control operation for the optical head is carried out in the speed control device for the optical head as described above.

When information recorded on the optical disk 15 is subjected to a reproducing operation or the like in the optical information recording and reproducing apparatus 1, an indication number of indicating a desired or destination track 16 on the optical disk 15 is input to a setting circuit (not shown), and a start button (not shown) is switched on to output a start signal, whereby the indication number of the desired track 16 is preset to the track count circuit 24 through the setting circuit. At the same time, the head actuator 43 for moving the optical head 20 to the desired track 16 on the optical disk 15 is controlled in the following speed servo loop.

First, an accelerating operation of the head actuator 43 for starting movement of the optical head 20 to the desired track 16 is carried out at a uniformly accelerating mode (operation) in an open loop as well known, and the uniformly accelerating operation is ceased and switched to a deceleration operation when a moving speed of the optical head 20 approaches a reference speed profile.

In the decelerating operation, a laser beam which is outputted from the moving optical head 20 is detected by the tracking error signal detection circuit 21 as shown in FIG. 1, and a tracking error signal 22 as shown in FIG. 5(a) is outputted from the tracking error signal detection circuit 21. Thereafter, the tracking error signal 22 is input to each of the track-traverse detection circuit 23 and the tracking servo circuit 40 as shown in FIG. 1. The track-traverse detection circuit 23 outputs a track-traverse signal 25 for inverting a logic state (1 or 0) every zero-cross point of the tracking error signal 22 as shown in FIG. 5(b). The track-traverse signal 25 as shown in FIG. 5(b) is input to each of the track count circuit 24 and the clock count circuit 33.

The track count circuit 24 counts the edges 51 as shown in FIG. 5(c) of the track-traverse signal 25 to obtain the number of tracks (track number) which have been traversed by the optical head 20, and calculates the number of residual tracks (residual track number) for an access operation on the basis of the counted track number and the indication number of the desired track which is beforehand outputted from the setting circuit (not shown). A residual track number signal 27 indicative of the residual track number is input to the reference speed conversion ROM 26 and a reference speed signal 28 as shown in FIG. 5(d) indicative of a reference speed for the residual track number is outputted from the reference speed conversion ROM 26.

The reference speed signal 28 is converted to an analog signal 30 by the D/A converter 29, and the value thereof is subjected to the zero-order hold as shown in FIG. 5(e) until a next edge of the track-traverse signal 25 is detected. The reference speed signal 28 which has been subjected to the zero-order hold is input through the first switching circuit 31 to the differential amplifier 32. At this time, the output terminal of the D/A converter 29 is selected by the first switching circuit 31.

On the other hand, the track-traverse signal 25 outputted from the track-traverse detection circuit 23 is input to the clock count circuit 33, in which a time interval between successive edge pulses 51 as shown in FIG. 5(c) of the track-traverse signal 25 is obtained by counting clocks outputted from the reference clock circuit 34. The counted clock number 36 is input to the relative speed conversion ROM 35, in which the clock number 36 is subjected to the inverse conversion as an address to obtain a relative speed detection signal 38 for the track-traverse motion. The relative speed detection signal 38 for the track traverse motion is converted to an analog signal 39 as shown in FIG. 5(f) by the D/A converter 37, and then input to the differential amplifier 32.

The differential amplifier 32 amplifies a difference signal 52 between the reference speed signal 30 and the relative speed detection signal for the track-traverse motion to obtain an output signal 52. The output signal 52 from the differential amplifier 32 is input through the second switching circuit 41 to the driver amplifier 42 to be amplified, and then is outputted to the head actuator 43. The optical head 20 is decelerated and moved at a speed corresponding to the reference speed signal 28 by the head actuator 43.

Through the above operations, the moving speed 53 of the optical head 20 is substantially linearly decelerated as shown in FIG. 5(f), that is, varies at the uniformly decelerating mode. However, the actual speed variation is delayed with respect to the ideal speed variation 54 at the uniform deceleration mode in the low speed range as shown in FIG. 5(f). On the other hand, when the optical head 20 approaches the desired track while decelerated linearly and reaches a track just preceding to the desired track (h of FIG. 5(f), a first timing signal 47 is generated by the timing generating circuit 44, and the first switching circuit 31 switches the output terminal of the D/A converter 29 to the terminal of the ground level as shown in FIG. 5(e). In addition, the differential amplifier 32 is supplied with only the relative speed detection signal 39 to carry out a residual speed feedback, and the decelerating operation is continued. Accordingly, as shown in FIG. 5(f), the decelerating operation of the optical head 20 is further continued with no disturbance even in a case where the speed of the optical head 20 exceeds the maximum speed for subjecting the optical head 20 to the tracking servo operation (hereinafter referred to as "maximum seekable speed") at the instantaneous time (i of FIG. 5(f)) when the optical head 20 is passed over the desired track.

After the predetermined time T has elapsed (j of FIG. 5(f)) since the generation of the first timing signal 47 by the timing generating 44, a second timing signal is generated by the timing generating 44, and the output terminal of the tracking servo circuit 40 is selected by the second switching circuit 50. At this time the speed of the optical head 20 is lower than the maximum seekable speed as shown in FIG. 5(f), and thus the optical head 20 can be accurately pulled or sought onto the desired track by the tracking servo circuit 40.

The optical head 20 passes over the desired track, but does not overrun the desired track by a distance above a half track pitch as shown in FIG. 5(a). The optical head 20 is returned from the overrunning position to the desired track in response to the signal from the tracking servo circuit 40 and is accurately pulled or sought onto the desired track at the time point K of FIG. 5(f).

As described above, in a case where the seek of the optical head 20 is carried out with the speed servo operation using the feedback of the difference signal between the reference speed signal 28 and the speed detection signal 39, the first timing signal 47 is outputted from the timing generating circuit 44 when the residual track number is reduced to a predetermined track number (that is, 1), and the ground level is selected by the first switching circuit 31. After the predetermined time T has elapsed since the output of the first timing signal 47 from the timing generating circuit 44, the second timing signal 50 is outputted from the timing generating circuit 44, and the second switching circuit 41 is driven to switch the difference signal at the output terminal of the differential amplifier 32 to the tracking servo signal at the output terminal of the tracking servo circuit 40. Therefore, even when the residual track number is reduced below 1, the decelerating operation of the optical head 20 is continued, and the deceleration of the optical head 20 can be accurately carried out at the substantially uniformly-decelerating mode. As a result, the seek operation can be carried out at high speed, and occurrence of a seek error in the seek operation can be prevented and the speed control in the seek operation can be made with high accuracy because the optical head 20 has been surely decelerated at a step where the optical head 20 is subjected to the tracking servo operation at a predetermined timing. Further, since the two-step control operation including the rough and concise seek operations as required in the conventional device is not required for this embodiment, complication in construction and extension in time required for the seek operation are prevented, and this enables the seek operation to be carried out at high speed.

Figure 7:
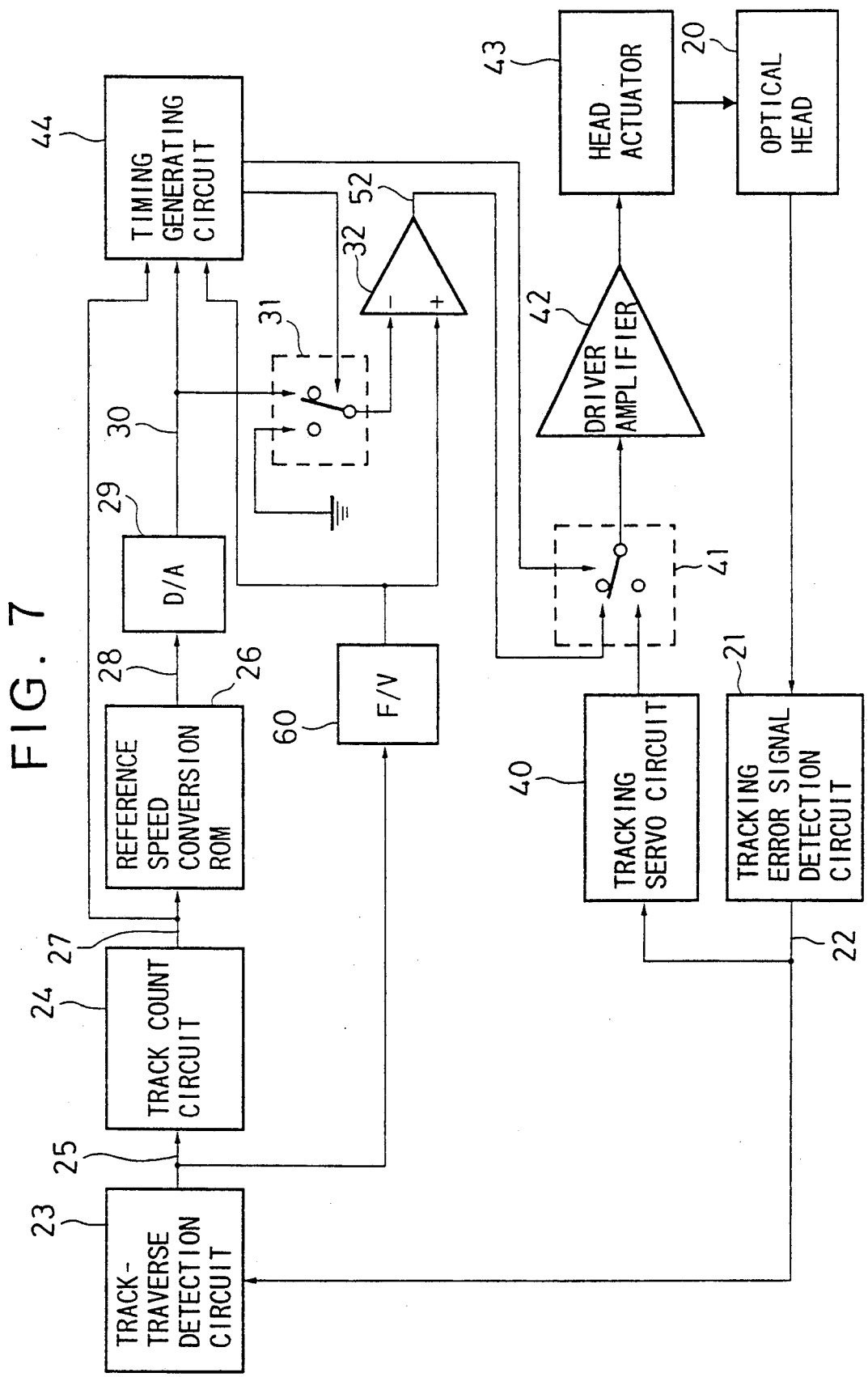
FIG. 7 is a block diagram of a second embodiment of the speed control device for the optical head according to this invention.

FIG. 7 shows a second embodiment of the speed control device according to this invention, and the same elements as those of the first embodiment are presented by the same reference numerals.

The speed control device of the optical head of this embodiment includes a first switching means for performing a switching operation between the reference speed signal and the ground level as the input source to the differential amplifying means to supply the selected one to the input terminal of the differential amplifying means, a second switching means for performing a switching operation between the difference signal of the differential amplifying means and the tracking servo signal as a feedback source to the actuator means to output the selected one to the actuator means, and a timing signal generating means for, in a speed control operation in the seek operation using the feedback of the difference signal between the reference speed signal and the speed detection signal, generating a first timing signal for allowing the first switching means to carry out the switching operation of switching to the ground level (the first switching operation) when a residual track number is reduced below a predetermined value, and a second timing signal for allowing the second switching circuit to carry out the switching operation of switching to the tracking servo signal (the second switching operation) when the speed detection signal is reduced below a predetermined value.

In FIG. 7, a reference numeral 60 represents an F/V (frequency-to-voltage) converter for converting a frequency of the track-traverse signal 25 of the track-traverse detection circuit 23 into a voltage signal, a reference numeral 44 represents a timing generating circuit for generating a first timing signal for driving the first switching circuit 31 to carry out the first switching operation and a second timing signal for driving the second switching circuit to carry out the second switching operation.

Figure 8:
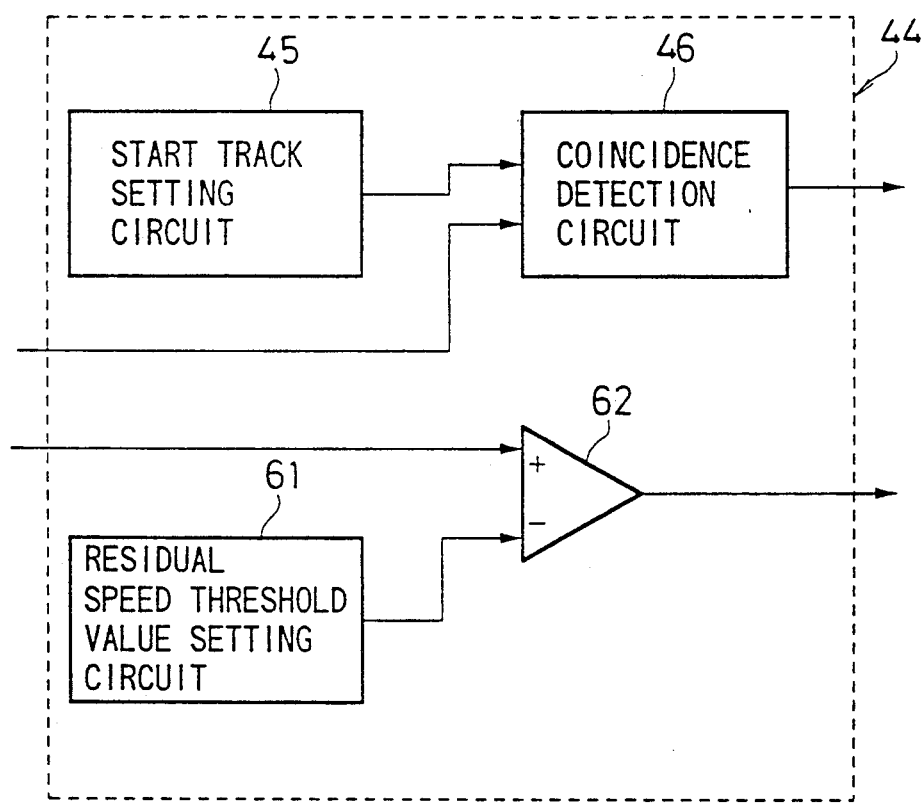
FIG. 8 is a block diagram of a timing generator of the second embodiment.

FIG. 8 is a circuit diagram for the timing generating circuit of this embodiment.

In FIG. 8, a reference numeral 45 represents a start track setting circuit for setting a prescribed value indicative of a residual track number to a desired track (that is, a seek track number), which determines a first timing for starting the first switching operation of the first switching circuit, and a reference numeral 46 represents a coincidence detection circuit for outputting a first timing signal 47 for starting the second switching operation of the second switching circuit 41 when it is detected that the residual track number represented by the residual track number signal from the track count circuit 24 is coincident with the seek track number which is beforehand set by the start track setting circuit 45.

As described above, the above elements and the functions thereof are similar to those of the first embodiment.

A reference numeral 61 represents a residual speed threshold value setting circuit 61 for setting a residual speed threshold value for driving the second switching circuit 41 to carry out the second switching operation of switching the output of the difference amplifier 32 to the output of the tracking servo circuit 40 as an input source to the driver amplifier 42 when the speed detection signal 39 outputted from the F/V converter 60 is equal to the residual speed threshold value, and a reference numeral 62 represents a differential amplifier for amplifying a difference signal between the speed detection signal 39 of the F/V converter 60 and the residual speed threshold value which is beforehand set by the residual speed threshold value setting circuit 61, and generating a second timing signal 50 when the speed detection signal 39 is below the residual speed threshold value.

The first timing for starting the first switching operation of the first switching circuit 31 is set to, for example, the instantaneous time when the optical head passes over a track just preceding to the desired track (that is, a track having a residual track number of 1), however, is not limited to this track. for example, the first timing may be set to the time for another previous track away from the desired track at a distance corresponding to any several tracks.

In the speed control of the seek operation of the optical head 20 using the feedback of the difference signal 52 between the reference speed signal 30 and the speed detection signal 39 in the speed control device of this embodiment thus constructed, the first timing signal 47 is outputted from the timing generating circuit 44 to select the ground level by the first switching circuit 31 when the residual track number is below 1, and then the second timing signal 50 is outputted from the timing generating circuit 44 to select the tracking servo signal by the second switching circuit 41 when the speed detection signal 39 is below a predetermined value (the residual speed threshold value). Therefore, the decelerating operation of the optical head 20 is continued by switching the reference speed signal 30 to the ground level when the residual track number is reduced below 1. Accordingly, the decelerating operation of the optical head 20 can be carried out at the uniformly-deceleration mode, and thus the seek operation of the optical head 20 can be carried out at high speed. In addition, the optical head 20 can be surely subjected to the tracking servo operation with confirmation or assurance of deceleration of the moving speed of the optical head 20 to the seekable speed at which the optical head 20 can be pulled onto the desired track. Further, since the two-step speed control operation is not required, complication in construction and extension in time required for the seek operation can be prevented, and this enables the seek operation to be carried out at high speed.

The other construction and action of this embodiment are identical to those of the first embodiment, and the description thereof is eliminated.

Figure 9:
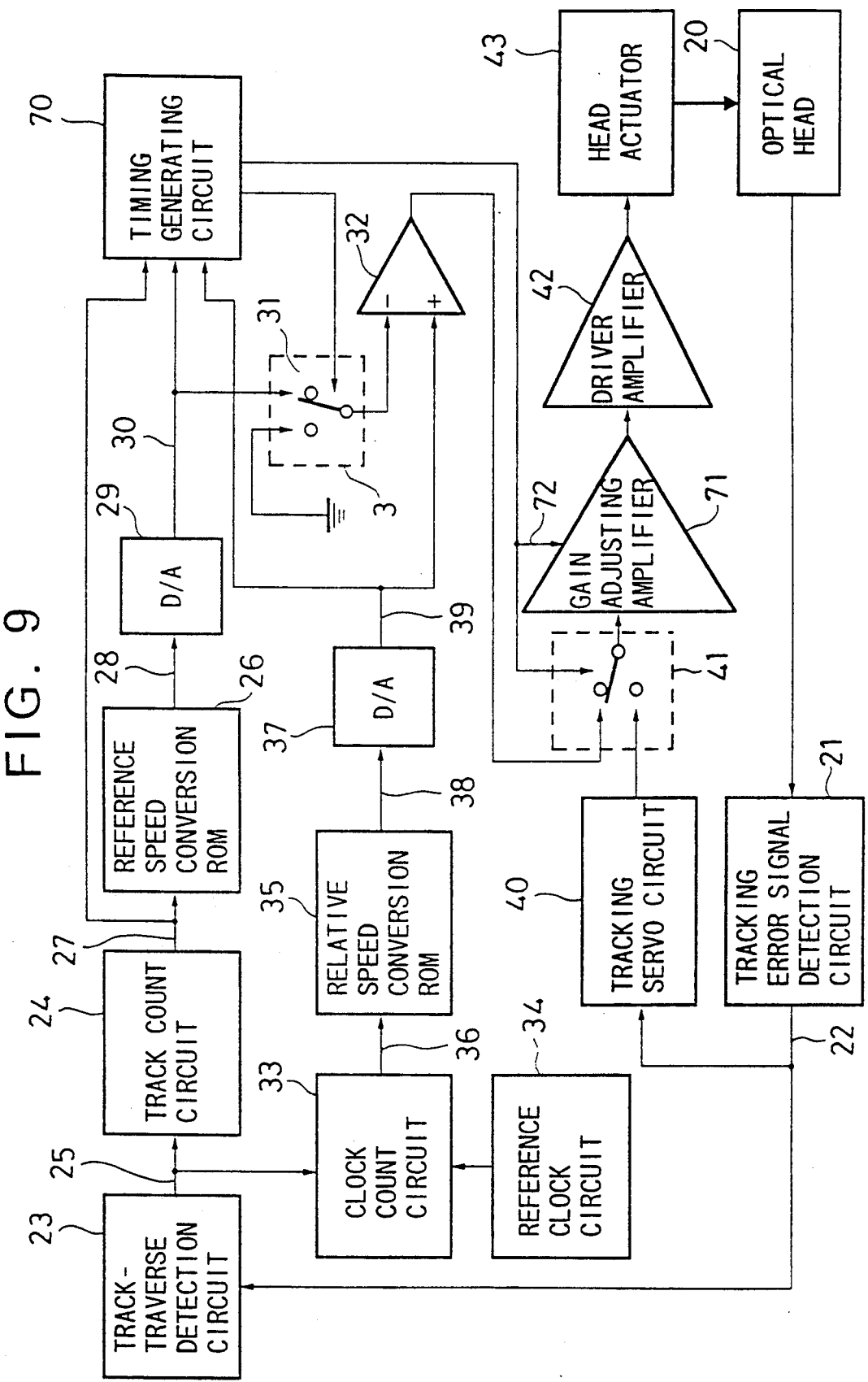
FIG. 9 is a block diagram of a third embodiment of the speed control device for the optical head according to this invention.

FIG. 9 shows a third embodiment of the speed control device for the optical head according to this invention. The same elements as those of the above embodiments are represented by the same reference numerals.

The speed control device of the optical head of this embodiment includes a first switching means for performing a switching operation between the reference speed signal and the ground level to supply the selected one to the input terminal of the differential amplifying means, a second switching means for performing a switching operation between the difference signal of the differential amplifying means and the tracking servo signal as a feedback source to the actuator means to output the selected one to the actuator means, and a timing signal generating and gain controlling means for, in the speed control of the seek operation using the feedback of the difference signal between the reference speed signal and the speed detection signal, generating a first timing signal for allowing the first switching means to carry out the first switching operation of selecting the ground level when the residual track number is reduced below a predetermined value and a second timing signal for allowing the second switching to carry out the second switching operation of selecting the tracking servo signal after a prescribed time has elapsed since the output of the first timing signal, and for adjusting the prescribed time and a gain when the difference signal between the reference speed signal and the speed detection signal is fed back in accordance with the moving speed of the optical head 20.

In FIG. 9, a reference numeral 70 represents a timing-generating and gain-controlling circuit for, in the speed control of the seek operation using the feedback of the difference signal between the reference speed signal 30 and the speed detection signal 39, outputting a first timing signal 47 for driving the first switching circuit 31 to carry out the first switching operation of selecting the ground level when the residual track number is reduced below a predetermined value, and a second timing signal 50 for driving the second switching circuit 41 to carry out the second switching operation of selecting the tracking servo signal when a prescribed time T has elapsed since the output of the first timing signal 47, and for adjusting the prescribed time T and a gain when the difference signal between the reference speed signal 30 and the speed detection signal 39 is fed back in accordance with the moving speed of the optical head 20. A reference numeral 71 represents a gain adjustment amplifier provided between the second switching circuit 41 and the driver amplifier 42 for adjusting the gain in accordance with a gain control signal 72 outputted from the timing-generating and gain-controlling circuit 70.

Figure 10:
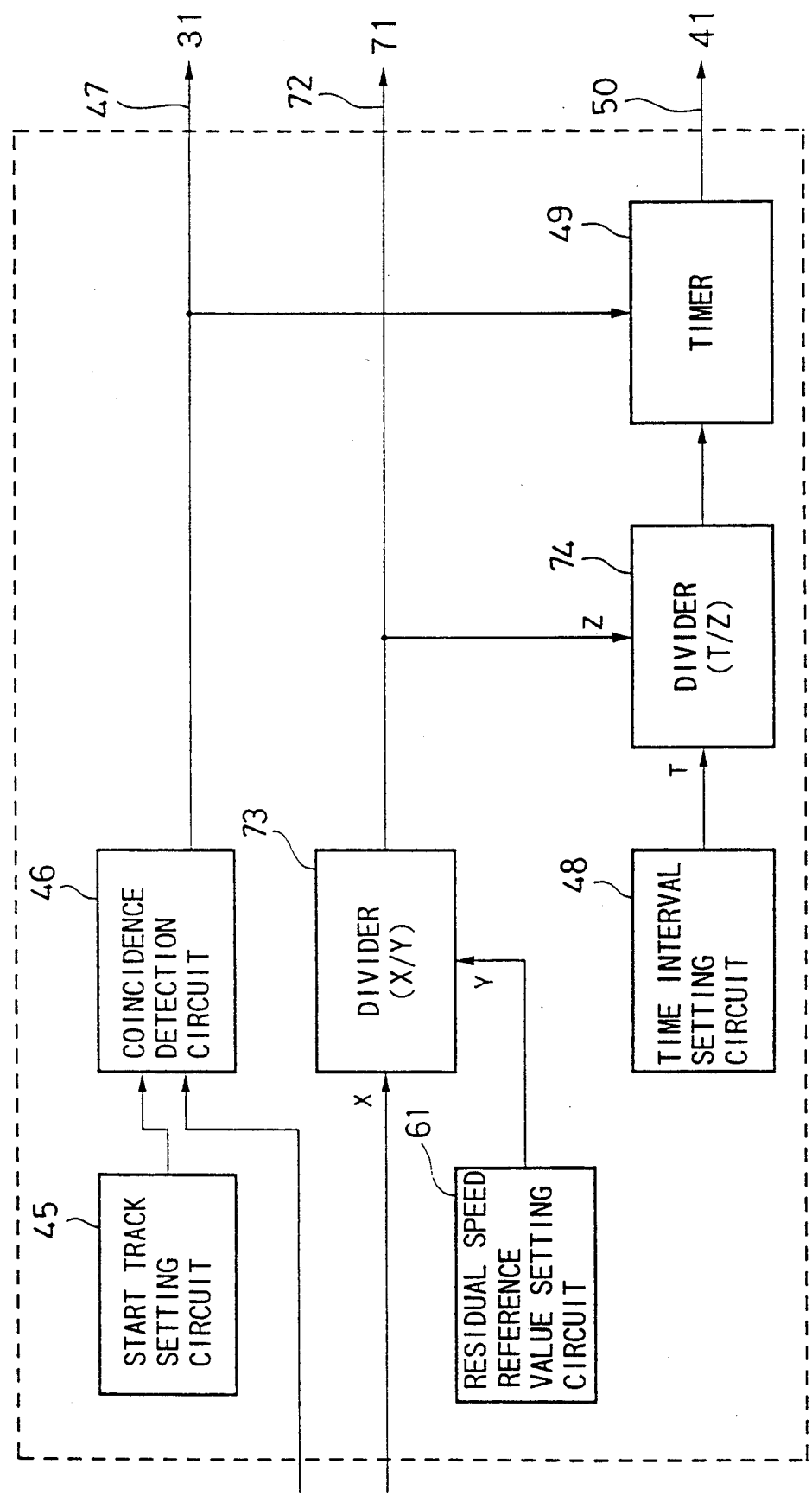
FIG. 10 is a block diagram of a timing generator of the third embodiment.
Figure 11:
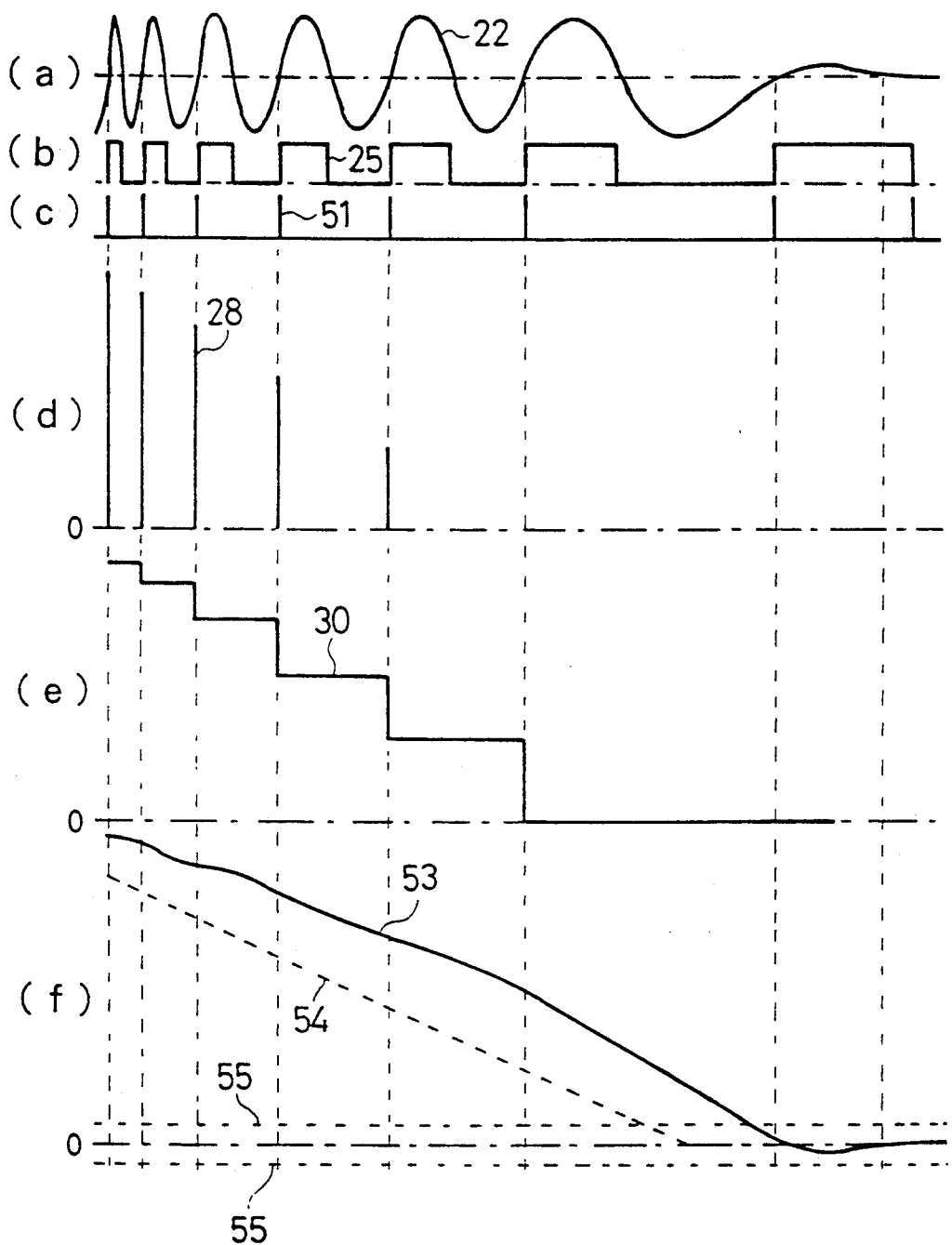
FIG. 11 shows an operation of a fourth embodiment of the speed control device for the optical head according to this invention.
Figure 12:
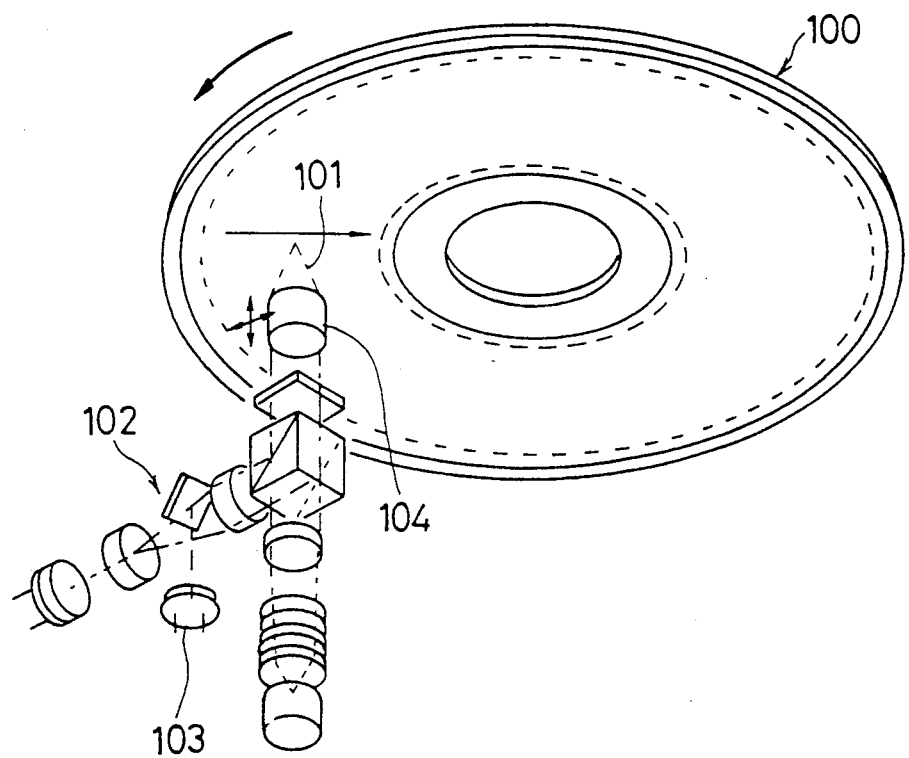
FIG. 12 is a schematic diagram for showing the construction of a conventional optical information recording and reproducing apparatus.
Figure 13:
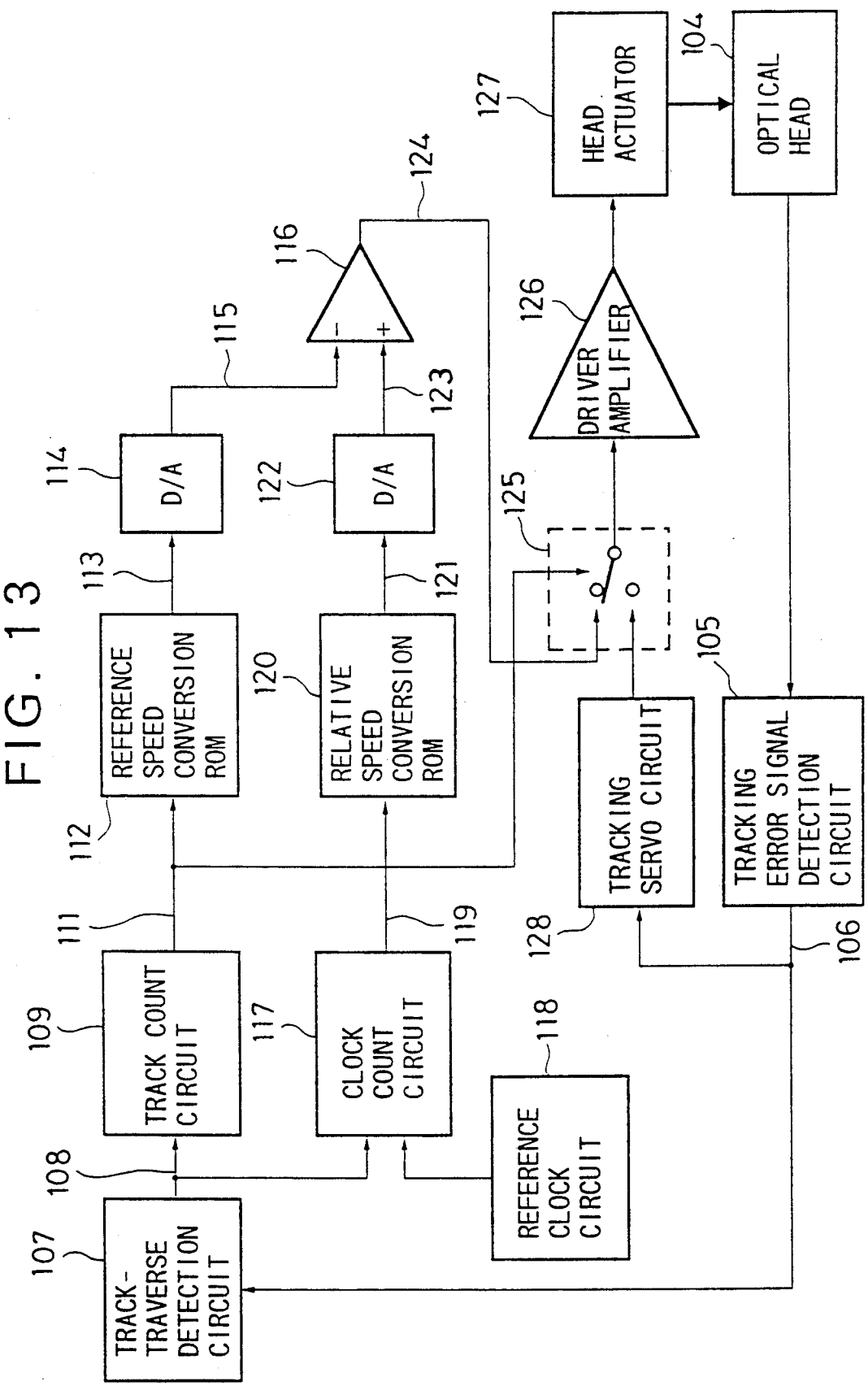
FIG. 13 is a block diagram for a conventional speed control device for an optical head.
Figure 14:
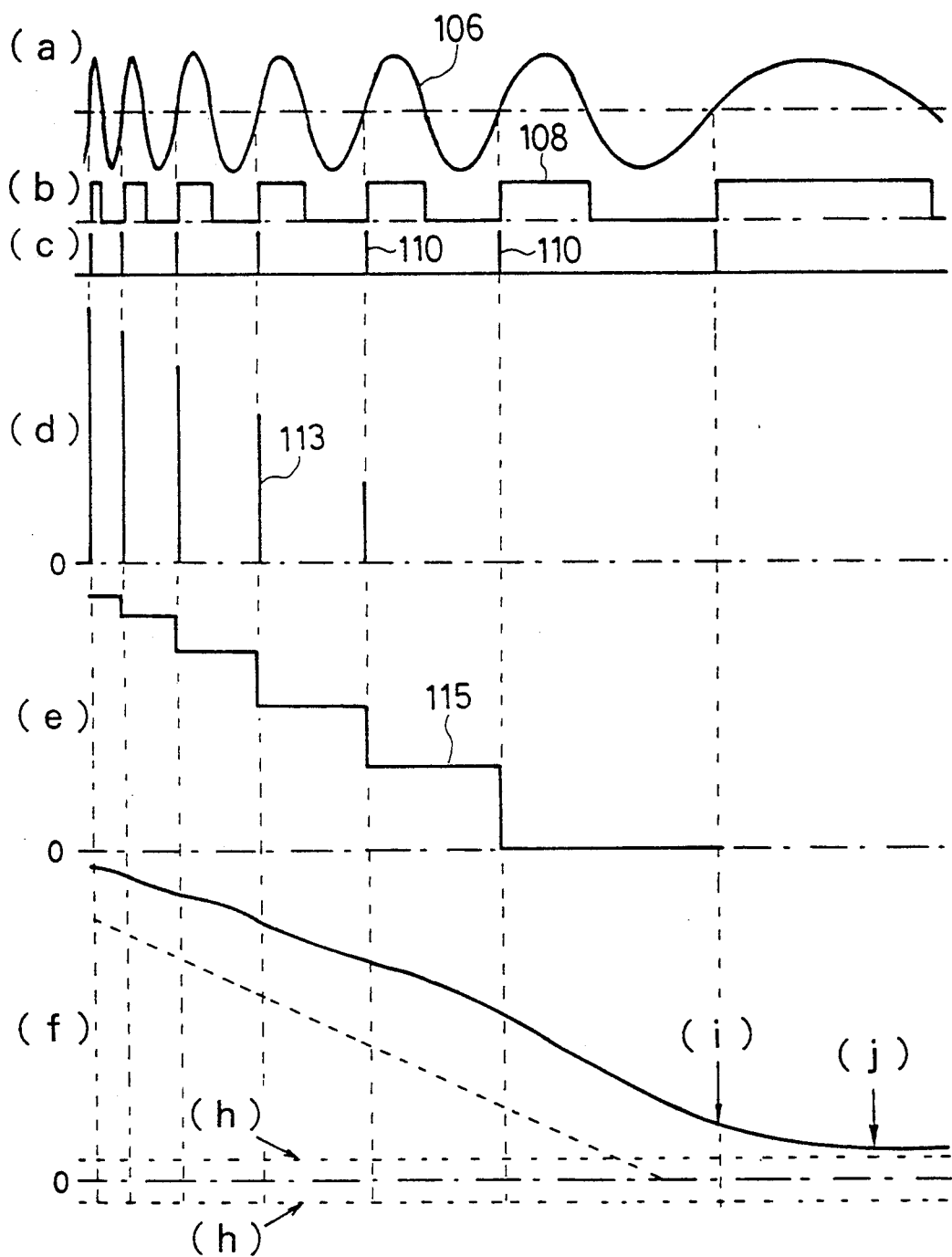
FIG. 14 is a graph showing an operation of the conventional speed control device for the optical head.

FIG. 10 is a circuit diagram for the timing-generating and gain-controlling circuit of this embodiment.

In FIG. 10, a reference numeral 45 represents a start track setting circuit for setting a prescribed value indicative of a residual track number to a desired track (that is, a seek track number), which serves to determine a first timing for starting the first switching operation of switching the output of the D/A converter 29 to the ground level by the switching circuit 31, and a reference numeral 46 represents a coincidence detection circuit for outputting a first timing signal 47 for starting the first switching operation of the first switching circuit 31 when it is detected that the residual track number of the residual track number signal from the track count circuit 24 is coincident with the seek track number which is beforehand set by the start track setting circuit 45. A reference numeral 61 represents a residual speed reference value setting circuit for setting a reference value for the residual speed of the optical head 20, a reference numeral 73 represents a divider for calculating the ratio (X/Y) of the speed detection signal 39 (X) outputted from the D/A converter 37 and the residual speed reference value (Y) which is beforehand set in the residual speed reference value setting circuit 61 and outputting a signal corresponding to the ratio (X/Y) as a gain control signal 72, a reference numeral 48 represents a time interval setting means for setting a prescribed time interval T from the time when the first timing signal 47 is outputted from the coincidence detection circuit 46 till the time when the second switching circuit 41 carries out the second switching operation, a reference numeral 74 represents a divider for normalizing the prescribed time interval T set by the time interval setting circuit 48 using an output (Z) of the divider 73, and a reference numeral 49 represents a timer for outputting a second timing signal 50 for driving the second switching circuit 41 to carry out the second switching operation when the lapse of the time interval T which is normalized by the divider 74 is clocked.

The first timing for starting the first switching operation of the first switching circuit 31 is set to, for example, to a time when the optical head 20 passes over a track just preceding to the desired track (that is, a track having a residual track number of 1), however, is not limited to this time. For example, the first timing may be set to a time for another previous track away from the desired track at a distance corresponding to several tracks.

The Residual speed reference value to be beforehand determined by the residual speed reference value setting means may be a reference speed value when the residual track number is equal to 1 (that is, a value immediately prior to the switching operation to the ground level), however, is not limited to this value. Further, the prescribed time interval T to be set by the time interval setting circuit 48 may be a period for which the moving speed of the optical head 20 is reduced below the seekable speed at which the optical head 20 can be pulled into or subjected to the tracking servo operation when the speed detection signal of the optical head 20 is equal to the reference speed value for the residual track number of 1 (the value immediately prior to the switching operation to the ground level), however, is not limited to the value.

The speed control operation for the optical head in this embodiment thus constructed will be described hereunder.

The operation of this invention is similar to that of the first embodiment. That is, in the speed control of the seek operation for the optical head 20 using the feedback of the difference signal 52 between the reference speed signal 30 and the speed detection signal 39, when the residual track number is reduced below a predetermined value (1), a first timing signal 47 is outputted from the incidence detection circuit 46 of the timing-generating and gain controlling circuit 70, so that the switching circuit 31 carries out a switching operation of switching the differential amplifier 32 side to the ground level side, and the decelerating operation of the optical head 20 is continued by the residual speed feedback. At the same time, the speed detection signal 39 of the optical head 20 is input to the divider 73 of the timing-generating and gain-controlling circuit 70, in which a ratio of the speed detection signal 39 and the residual speed reference value determined beforehand by the residual speed reference value setting circuit 61 is calculated as shown in FIG. 10.

Here, assuming that the speed detection signal 39 of the optical head 20 is 1.2 times of the reference speed value 30 for the residual track number of 1 (the value immediately prior to the switching operation to the ground level side), the ratio of the speed detection signal 39 and the residual speed reference value is calculated into 1.2 by the divider 73. This value of 1.2 is outputted as a gain control signal 72 to the gain adjusting circuit 71, and the gain adjusting circuit performs an adjusting operation so that the gain of the residual speed feedback is 1.2 times of an ordinary value.

The output signal of the divider 73 is input to the divider 74, in which the prescribed time interval T set by the time interval setting circuit 48 is normalized. That is, the time interval T which is set by the time interval setting circuit 48 is divided by the output of the divider 73 (Z=1.2) in the divider 74 to output a resultant (T/1.2) to the timer 49.

The timer 49 outputs the second timing signal 41 at the time when it clocks the time lapse corresponding to the output signal (T/1.2) of the divider 74 from the time when the first timing signal 31 is outputted from the coincidence detection circuit 46. Accordingly, when the first timing signal 47 is outputted from the timing-generating and gain-controlling circuit 70 to allow the first switching circuit 31 to switch the differential amplifier 32 side to the ground level side and continue the decelerating operation through the residual speed feedback, the decelerating operation is carried out at 1.2 times of an ordinary deceleration rate because the gain of this case is set to 1.2 times of an ordinary gain. Moreover, the timer interval of this case from the time when the first switching circuit 31 carried out the switching operation from the differential amplifier 32 side to the ground level side to the time when the second switching circuit 41 carried out the switching operation of switching to the tracking servo is set to 1.2 times of the prescribed time interval T. As a result, since the optical head 20 is subjected to the tracking servo operation after the decelerating operation of the optical head 20 is carried out for a time interval corresponding to 1.2 times of the prescribed time interval T at a deceleration rate of 1.2 times of the prescribed deceleration rate, a distance of the optical head 20 which can move from the time when the first timing signal is outputted to the time when the tracking servo is started, can be set to a substantially constant one. Therefore, even if the moving speed of the optical head 20 at the starting time of the residual speed feedback is considerably larger than the reference speed, the optical head 20 can be surely pulled onto the desired track by the tracking servo operation. Further, since the two-step speed control is not required, the complication in construction and the extension of the time required for the seek operation are prevented. This also enables the seek operation to be carried out at high speed.

The other construction and action as described above are similar to those of the foregoing embodiments, and thus the description thereof is eliminated.

Figure 15:
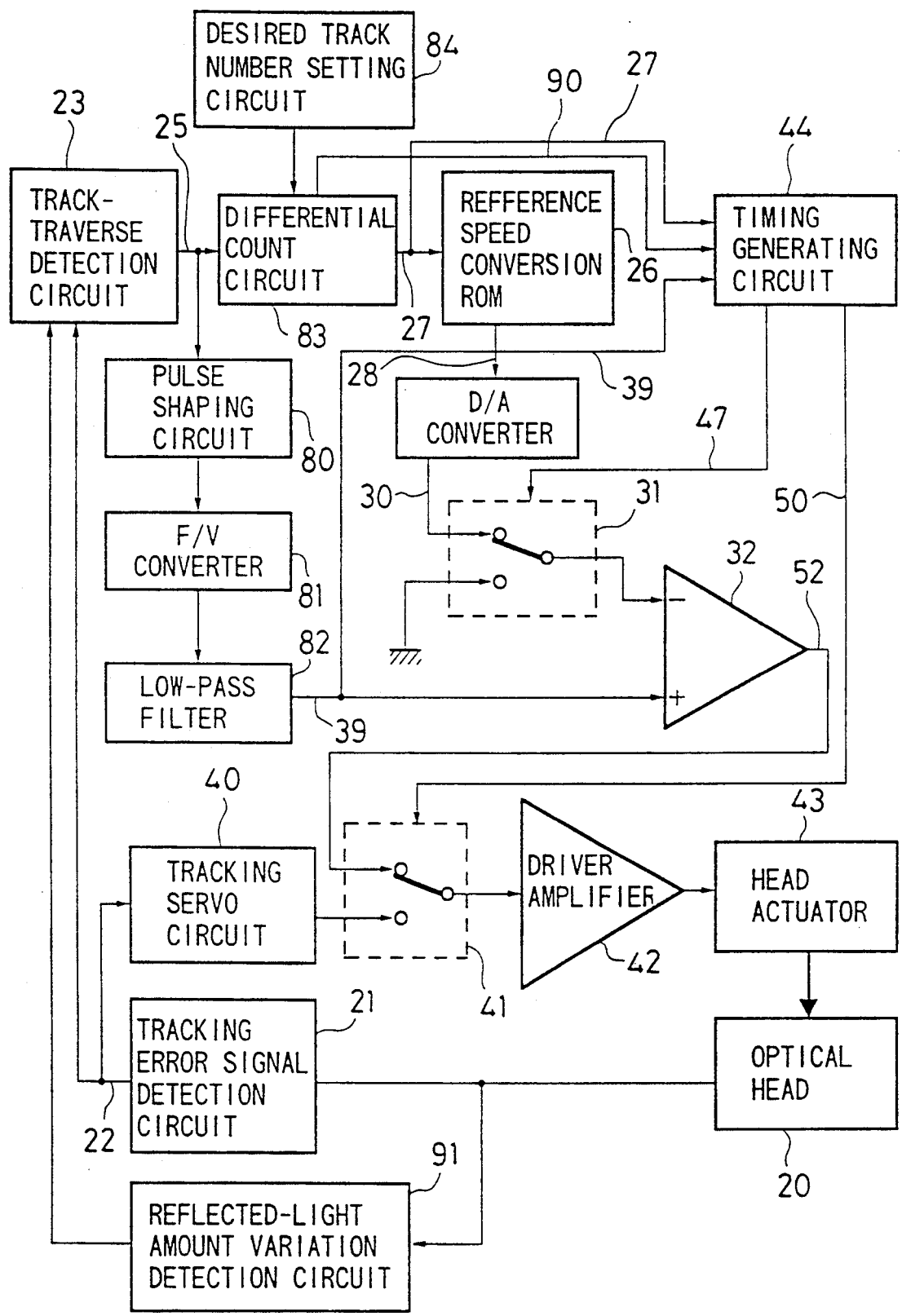
FIG. 15 is a block diagram for the fourth embodiment of the speed control device for the optical head according to this invention.

FIG. 15 shows a fourth embodiment of the speed control device for the optical head according to this invention.

The speed control device of the optical head of this embodiment includes a first switching means for performing a switching operation between the reference speed signal and the ground level to supply the selected one to the input terminal of the differential amplifying means, a second switching means for performing a switching operation between the difference signal of the differential amplifying means and the tracking servo signal as a feedback source to the driving means to output the selected one to the driving means, and a timing signal generating means for, in the speed control of the seek operation for the optical head 20, generating a first timing signal for driving the first switching means to switch to or select the ground level when a residual track number is reduced below a predetermined value and a second timing signal for driving the second switching to switch to or select the tracking servo signal after a prescribed time has elapsed since the output of the first timing signal and when the optical head 20 passes over a prescribed track position.

In the seek operation of the first to third embodiments, the time interval from the time when the reference speed signal of the speed control system is switched to the ground level to the time when the tracking servo is selected, that is, the time interval from the time when the first switching circuit is actuated in response to the timing signal of the timing generating circuit to the time when the second switching circuit is actuated, is determined by the time interval setting circuit 48 of FIG. 4 or the residual speed reference value setting circuit 61 of FIG. 8. This time interval is ordinarily set to a suitable value in consideration of servo-permissible band (range) of the speed control system and the tracking servo system. However, it has been recently reported in a paper of "The Television Society", Vol. 44, No. 10, pp. 1391-1397 that it is required for the seeking of an optical spot of an optical head not only to reduce the residual speed of the optical head below the seekable speed at which the optical head can be surely pulled onto a desired track, but also to switch the speed control operation to the tracking servo operation at the time when the optical head is located at a position between the desired track and a prescribed position (for example, a preceding track away from the desired track by a half track pitch), and a seek error such as an overrunning of the optical spot from the desired track or the pulling of the optical spot to a track preceding to the desired track frequently occurs if the above conditions are not satisfied.

Figure 16:
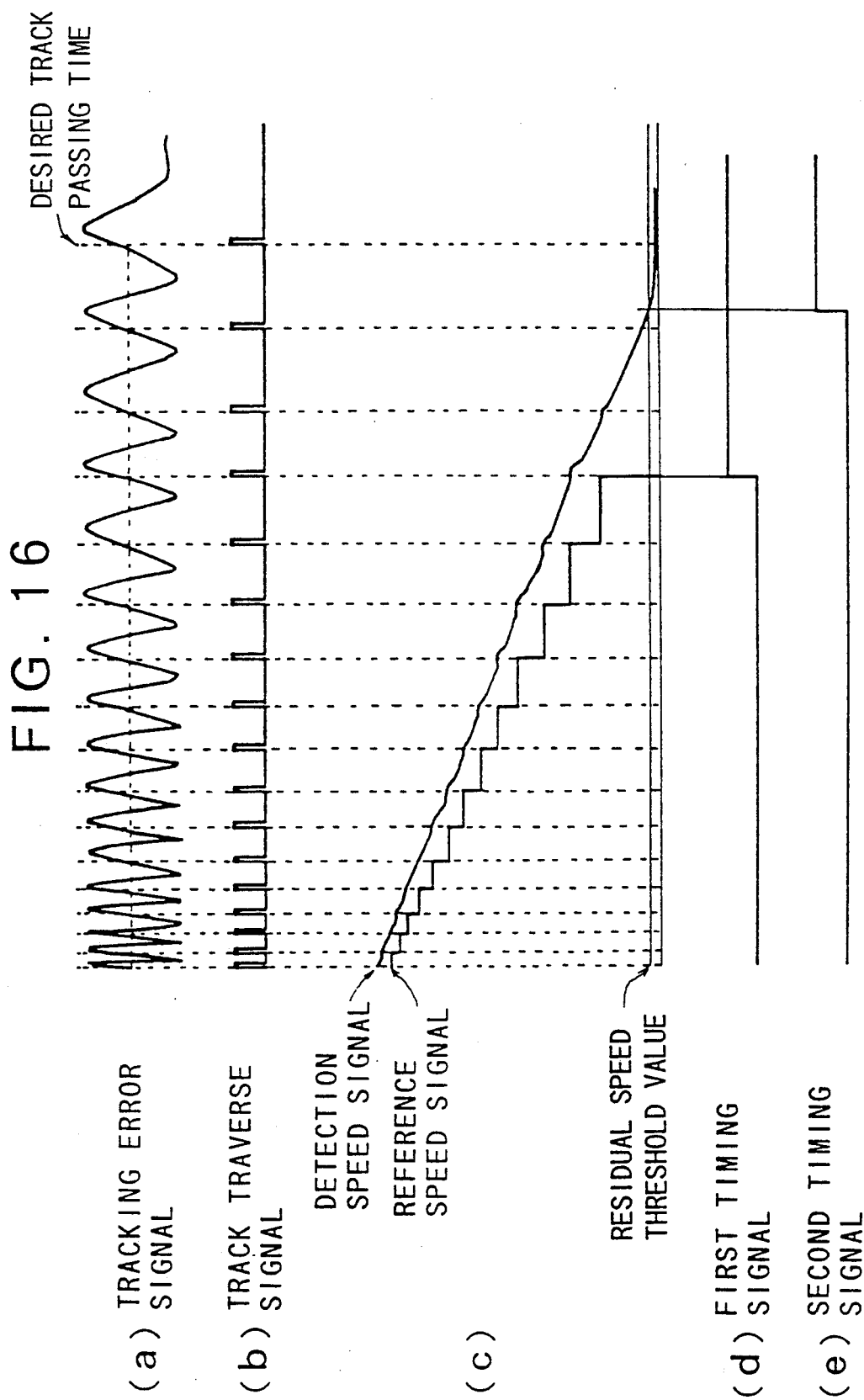
FIG. 16 is a graph showing an operation of the conventional speed control device for the optical head.

The timing generating circuits of the first to third embodiments are so designed that the second timing signal for starting the second switching operation of the second switching circuit when the residual speed (the relative speed of the optical spot when the reference speed becomes the ground level) is below a predetermined threshold level (the seekable speed). Therefore, in these embodiments, when the second timing signal 50 is outputted, the residual speed is surely reduced below the seekable speed, but the tracking operation is switched on at a position near to a track just preceding to the desired track as shown in FIG. 16. This means that it is not sure to accurately switch the speed control operation to the tracking servo operation at the prescribed position where the optical spot can pulled to the desired track. Therefore, there is a probability that the optical spot would overrun the desired track or be pulled on a track preceding to the desired track to thereby producing a seek error, and thus there is a case where the accurate pulling operation of the optical spot to the desired track can not performed.

Further, in the timing generating circuit using the time interval setting circuit or the like as disclosed in the first to third embodiments, it seems to be possible that the prescribed value to be set by the time interval setting circuit or the like is adjusted to surely perform the switching operation from the speed control operation to the tracking servo operation at the position where the optical spot can be surely pulled on the desired track. However, in this case, there is a disadvantage that the time setting for providing the accurate switching operation from the speed control system to the tracking servo system at a position between the desired track and the prescribed position can not be carried out due to the dispersion of the residual speed or the like.

In view of the foregoing disadvantages, this embodiment performs an accurate pulling operation of the optical head to the desired track irrespective of the dispersion of the residual speed.

FIG. 15 is a block diagram for the fourth embodiment of the speed control device for the optical head according to this invention, and the same elements as those of the first embodiment are represented by the same reference numerals.

In FIG. 15, a reference numeral 80 represents a pulse shaping circuit for shaping a pulse wave of the track-traverse signal 25 outputted from the track-traverse detection circuit 23. A reference numeral 81 represents a F/V converter for converting a frequency value of the track-traverse signal 25 having the shaped pulse wave into a voltage signal, and a reference numeral 82 represents a low-pass filter for removing a high frequency component from the voltage signal outputted from the F/V converter 81. The output signal 39 from the low-pass filter 82 is input as a speed detection signal to each of the differential amplifier 32 and the timing generating circuit 44.

A reference numeral 83 represents a differential count circuit, and a reference numeral 84 represents a desired track number setting circuit for setting a track number of the desired track to which the optical head is moved. The differential count circuit 83 serves to reduce the desired track number set by the desired track number setting circuit 84 one by one each time a pulse signal serving as the track-traverse signal 25 is outputted from the track-traverse detection circuit 23, thereby calculating the number of residual tracks for the seek operation.

Figure 17:
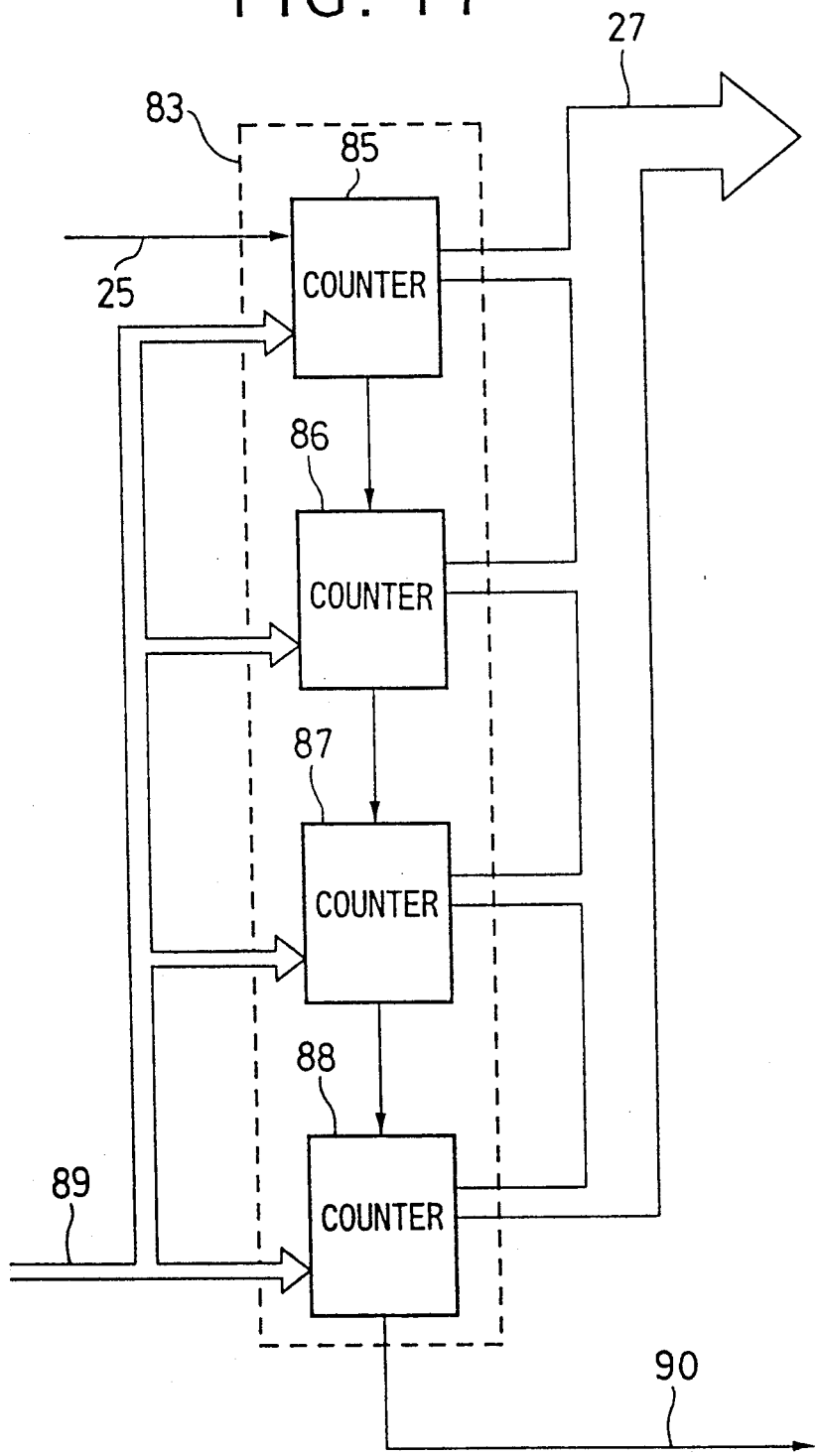
FIG. 17 is a block diagram for showing a differential counter.

The construction of the differential count circuit 83 will be described hereunder with reference to FIG. 17.

The differential count circuit 83 includes four counters 85, 86, 87 and 88 which represent numbers of four figures and correspond to a first figure (the number of units), a second figure (the number of tens), a third figure (the number of hundreds) and a fourth figure (the number of thousands), respectively. These counters 85, 86, 87 and 88 are supplied with respective desired track setting signals 89 each of which represents the number of each figure of the desired track set through the desired track number setting circuit 84, and preset with these values. The counter 85 representing the lowest figure value is supplied with the track-traverse signal 25 from the track-traverse detection circuit 23, and the number of the units (the lowest figure value) of the desired track number which is beforehand set, is reduced by 1 every input of the track-traverse signal 25 from the track-traverse detection circuit 23 thereto. When the lowest figure value of the counter 85 is zero, the above subtraction or reduction operation is successively conducted on the next upper figure value (the number of tens) of the counter 86 and then on the subsequent upper figure values of the counters 87 and 88. The differential count circuit 83 is so designed that a desired track detection signal 90 is outputted from the counter 88 for the most upper figure when the above successive subtraction or reduction operations are conducted on all of the counters and the numbers of all of the figures are finally equal to zero. Further, the residual count number of each figure is successively outputted as a residual track number signal 27 for the seek operation from each of the counters 85, 86, 87, and 88.

A reference numeral 91 represents a reflected-light amount variation detection circuit, and comprises a detection circuit for detecting the sum of outputs of two elements of a two-segmented photodetector which is ordinarily provided to the optical head 2. The sum signal of the outputs which is outputted from the reflected-light amount variation detection circuit 91 is obtained when the optical spot passes over a track, and the phase thereof is shifted from that of the tracking error signal 22 (a difference signal of the outputs of the two-segmented photodetector) substantially by 90°. In general, the track-traverse detection can be made with one of the tracking error signal 22 (difference signal) and the reflected-light amount variation signal (sum signal), however, in a special device, a track-traverse detection circuit in which a malfunction hardly occurs can be designed using both of the difference and sum signals.

Figure 18:
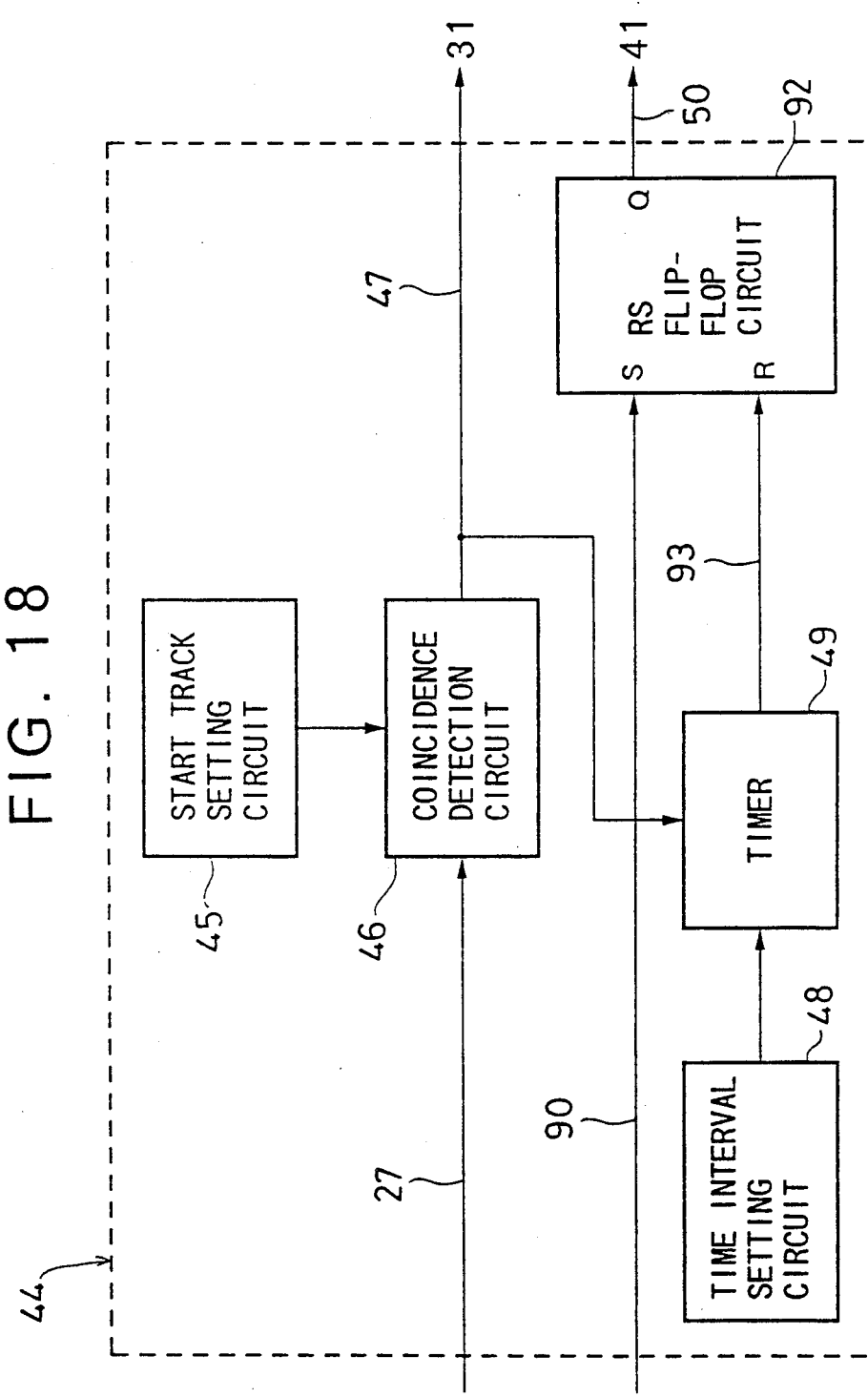
FIG. 18 is a block diagram for a timing generator pertaining to the second embodiment.

The timing generating circuit 44 of this embodiment is shown in FIG. 18, and the same elements as those of the first embodiment are represented by the same reference numerals.

In FIG. 18, a reference numeral 92 represents an RS flip-flop circuit, and has a reset terminal (R) to which the output signal 93 of the timer 49 is input and a set terminal (S) to which the desired track detection signal 90 of the differential count circuit 83 is input. The RS flip-flop circuit 92 is designed so as to be reset in response to the input of the output signal 93 from the timer 49 to the reset terminal (R) thereof, and then output the second timing signal 50 of "H" signal through the output terminal (Q) thereof to the second switching circuit 41 in response to the input of the desired track detection signal 90 from the differential count circuit 83 to the set terminal (S).

The speed control of the seek operation for the optical head 20 using the feedback of the difference signal 52 between the reference speed signal 30 and the speed detection signal 39 in this embodiment will be described hereunder.

Figure 19:
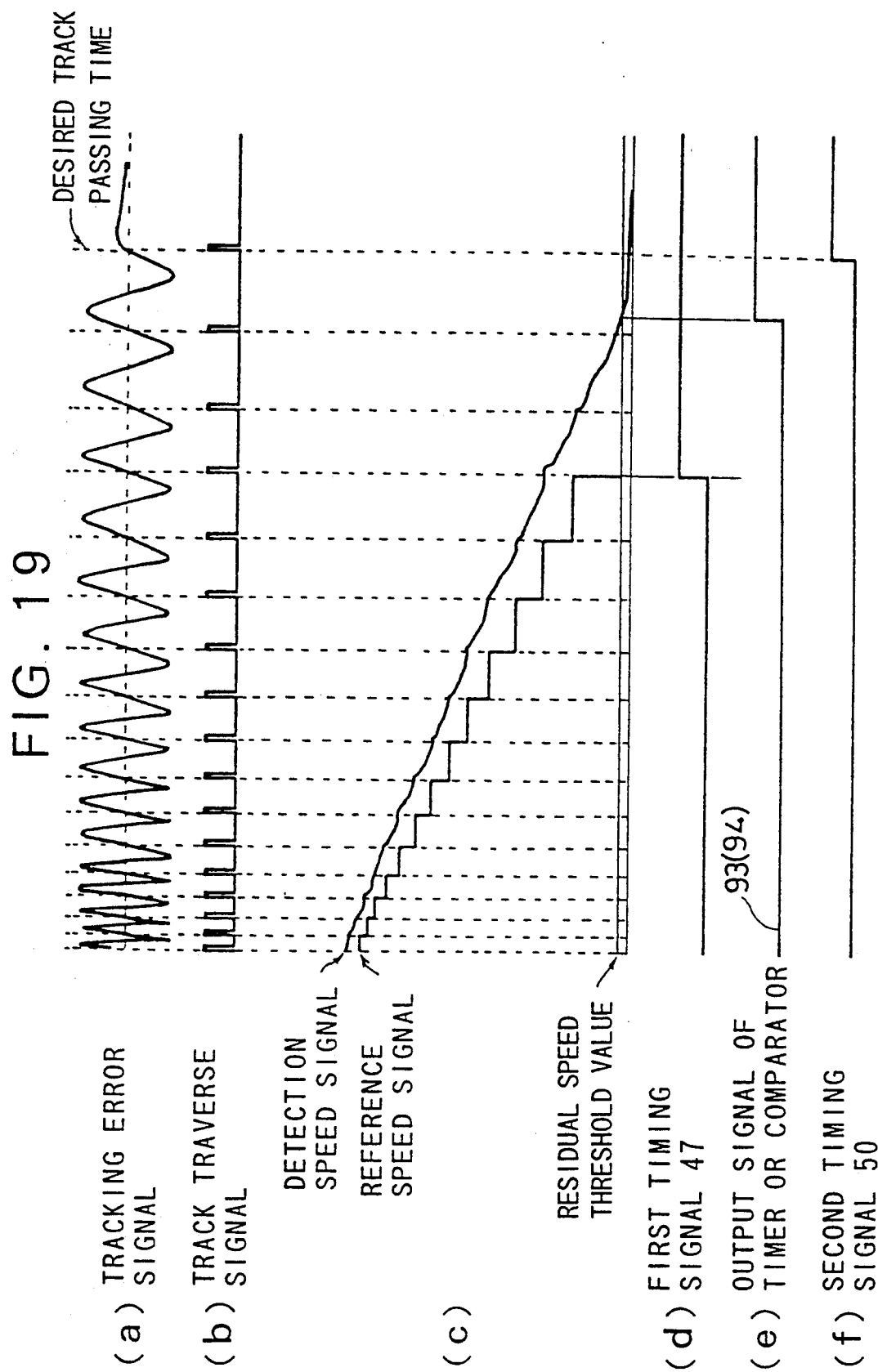
FIG. 19 is a graph showing an operation of the fourth embodiment.

As shown in FIG. 19, when the residual track number is equal to 3, the first timing signal 47 is outputted from the timing generating circuit 44, and the first switching circuit 31 selects the ground level. Subsequently, when the timer 49 clocks the lapse of the time interval which is set by the time interval setting circuit 48 since the output of the first timing signal 47, the output signal 93 of the timer 49 is input to the reset terminal (R) of the RS flip-flop circuit 92, so that the RS flip-flop circuit 92 is reset. Next, when the optical head 20 reaches the desired track and the desired track detection signal 90 is input from the differential count circuit 83 to the set terminal (S) of the RS flip-flop circuit 92, the RS flip-flop circuit 92 is set and the second timing signal 50 of "H" signal is outputted through the output terminal (Q) thereof to the second switching circuit 41, so that the speed control operation is switched to the tracking servo operation by the second switching circuit 41. That is, when the speed control operation is switched to the tracking servo operation by the second switching circuit 41, the lapse of the prescribed time interval is assured. Therefore, the residual speed of the optical head 20 is surely decelerated below the seekable speed at which the optical head 20 can be pulled onto the desired track, and in addition the position of the optical head 20 where the speed control operation is switched to the tracking servo operation is determined in accordance with the desired track, so that the optical head 20 can be accurately pulled onto the desired track irrespective of the residual speed of the optical head.

The construction and action other than described above are similar to those of the first embodiment, and thus the description thereof is eliminated.

In the above embodiment, the residual speed of the optical head scarcely varies irrespective of the seek distance and the seek time. Therefore, there is no probability that the optical head has passed over the desired track before the lapse of the prescribed time interval is assured. If there occurs a case where the optical head 20 has passed over the desired track before the lapse of the prescribed time interval is assured, the residual speed of the optical head 20 can be reduced below the seekable speed at a position preceding to the desired track by merely adjusting the time interval to be set by the timer 49 to a suitable value. Once a time interval is suitably set by the timer 49, it is not necessary to alter the time interval. Further, even in a case where the optical head 20 has passed over the desired track before the lapse of the prescribed time interval is assured, the second timing signal 50 may be outputted in response to the traverse of the optical head 20 over the desired track if it is assured that the residual speed of the optical head 20 is below the seekable speed. In this case, a timer, a speed detection circuit or the like is required to assure that the residual speed of the optical head 20 is below the seekable speed at which the optical head can be pulled onto the desired track.

Figure 20:
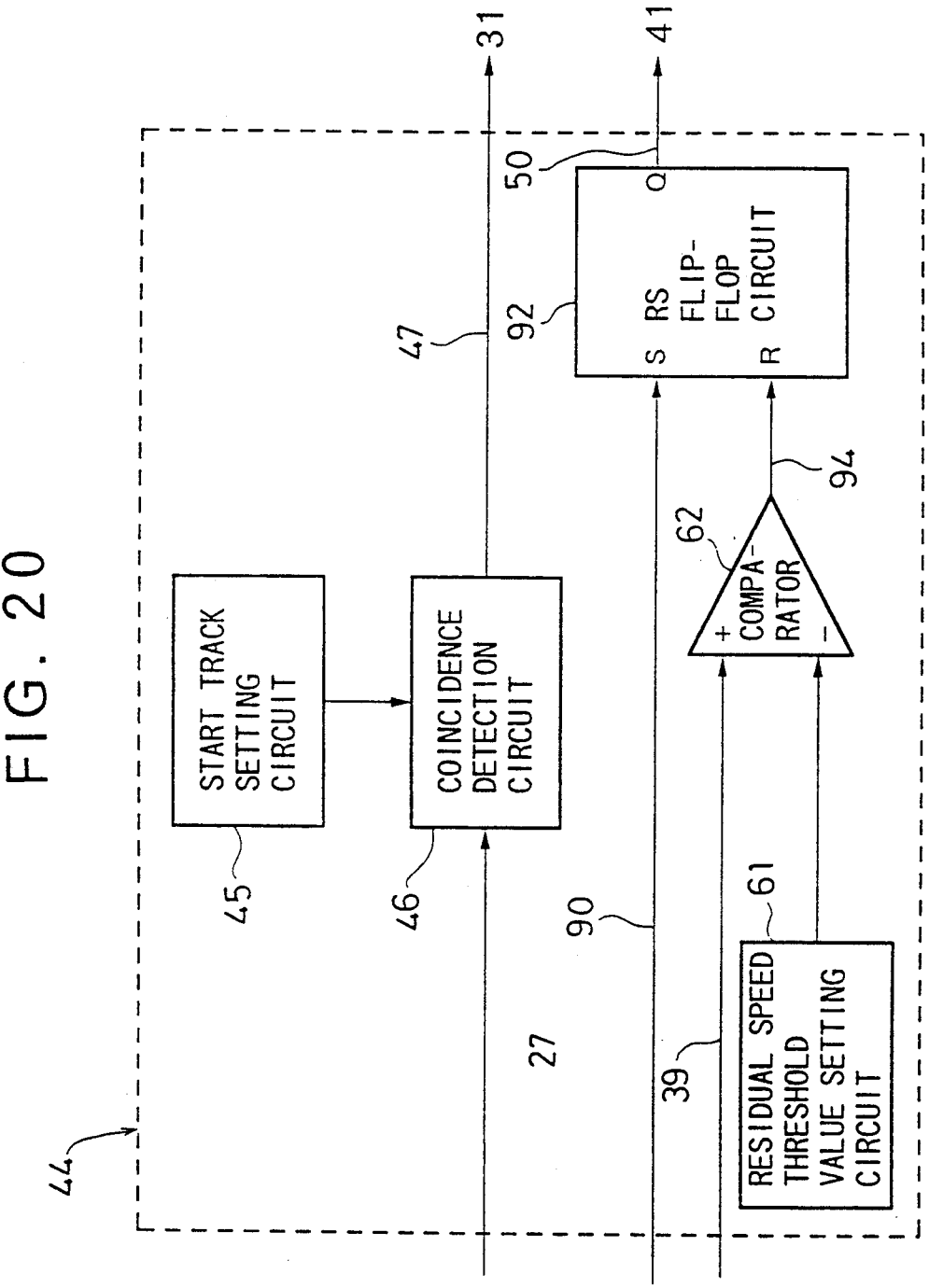
FIG. 20 is a block diagram of a timing generator for a fifth embodiment.

FIG. 20 shows a fifth embodiment of the speed control device for the optical head according to this invention, and the same elements as those of the second embodiment are represented by the same reference numerals.

The speed control device of the optical head of this embodiment includes a first switching means for performing a switching operation between the reference speed signal and the ground level to supply the selected one to the input terminal of the differential amplifying means, a second switching means for performing a switching operation between the difference signal of the differential amplifying means and the tracking servo signal as a feedback source to the driving means to output the selected one to the driving means, and a timing signal generating means for, in the speed control of the seek operation for the optical head case using the feedback of the difference signal between the reference speed signal and the speed detection signal, generating a first timing signal for driving the first switching means to carry out the first switching operation of switching to the ground level when a residual track number is reduced below a predetermined value and a second timing signal for driving the second switching to carry out the second switching operation of switching to the tracking servo signal when the speed detection signal is below a predetermined value and the optical head 20 passes over a prescribed track position.

The timing generating circuit 44 of this embodiment is constructed as shown in FIG. 20, and the same elements as those of that of the second embodiment are also represented by the same reference numerals.

In FIG. 20, a reference numeral 92 represents an RS flip-flop circuit, and has a reset terminal (R) to which an output signal 94 of a comparator 62 is input, and a set terminal (S) to which the desired track detection signal 90 of the differential count circuit 83 is input. The RS flip-flop circuit 92 is designed so as to be reset in response to the input of the output signal 94 from the comparator 62, and then outputs the second timing signal 50 of "H" signal from the output terminal (Q) thereof to the second switching circuit 41 in response to the input of the desired track detection signal 90 from the differential count circuit 83.

The speed control of the seek operation for the optical head 20 using the feedback of the difference signal 52 between the reference speed signal 30 and the speed detection signal 39 in this embodiment will be described hereunder.

As shown in FIG. 19, when the residual track number is equal to 3, the first timing signal 47 is outputted from the timing generating circuit 44, and the first switching circuit 31 selects the ground level. Subsequently, when the speed detection signal 39 is below a predetermined value, the output signal 94 of the comparator 62 is input to the reset terminal (R) of the RS flip-flop circuit 92, and the RS flip-flop circuit 92 is reset. Next, when the optical head 20 reaches the desired track and the desired detection signal 90 of the differential count circuit 83 is input to the set terminal (S) of the RS flip-flop circuit 92, the RS flip-flop circuit 92 is set to output the second timing signal 50 of "H" signal through the output terminal (Q) thereof to the second switching circuit 41, so that the speed control system is switched to the tracking servo system by the second switching circuit 41. Therefore, when the second switching circuit 41 carries out the first switching operation of switching the speed control operation to the tracking servo operation, the residual speed of the optical head is surely decelerated below the seekable speed at which the optical head 20 can be pulled onto the desired track by the adder 62, and in addition the position of the optical head 20 where the speed control operation is switched to the tracking servo operation is determined in accordance with the desired track position, so that the optical head 20 can be accurately pulled onto the desired track irrespective of the residual speed of the optical head 20.

The construction and action other than described above are similar to those of the second embodiment, and thus the description thereof is eliminated.

Figure 21:
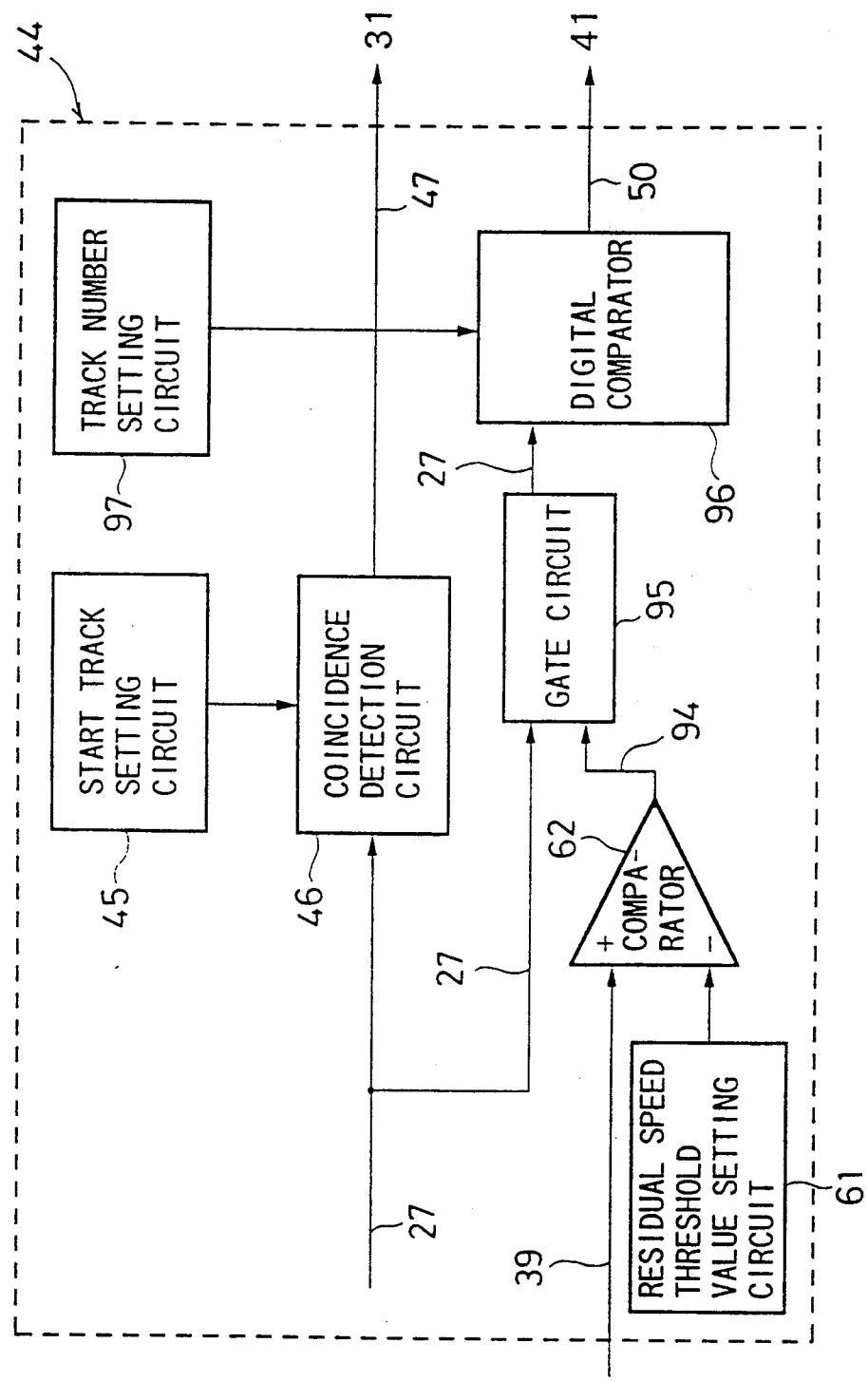
FIG. 21 is a block diagram of a timing generator for a six embodiment.

FIG. 21 shows a sixth embodiment of this invention, and the same elements as those of the fifth embodiment are represented by the same reference numerals.

FIG. 21 shows a sixth embodiment of the speed control device for the optical head according to this invention, and the same elements as those of the fifth embodiment are represented by the same reference numerals.

The speed control device of the optical head of this embodiment includes a first switching means for performing a switching operation between the reference speed signal and the ground level to supply the selected one to the input terminal of the differential amplifying means, a second switching means for performing a switching operation between the difference signal of the differential amplifying means and the tracking servo signal as an feedback source to the driving means to output the selected one to the driving means, and a timing signal generating means for, in the speed control of the seek operation for the optical head using the feedback of the difference signal between the reference speed signal and the speed detection signal, generating a first timing signal for driving the first switching means to carry out the first switching operation of switching to the ground level when the residual track number is reduced below a predetermined value and a second timing signal for driving the second switching to carry out the second switching operation of switching to the tracking servo signal when the speed detection signal is below a predetermined value and the residual track number reaches a predetermined value.

The timing generating circuit 44 of this embodiment is constructed as shown in FIG. 21, and the same elements as those of that of the fifth embodiment are also represented by the same reference numerals.

In FIG. 21, a reference numeral 95 represents a gate circuit which is switched to an open state when the output signal 94 of "H" is outputted from the comparator 62 thereto, to thereby pass therethrough the residual track signal 27 outputted from the differential count circuit 83. A reference numeral 96 represents a digital comparator for comparing the residual track number signal 27 passed through the gate circuit 95 with a track number which is beforehand set by a track number setting circuit 97 (for example, a value below several tracks), and outputting the second timing signal 50 when both are incident with each other.

The speed control of the seek operation for the optical head 20 using the feedback of the difference signal 52 between the reference speed signal 30 and the speed detection signal 39 in this embodiment will be described hereunder.

As shown in FIG. 19, when the residual track number is equal to 3, the first timing signal 47 is outputted from the timing generating circuit 44, and the first switching circuit 31 selects the ground level. Subsequently, when the speed detection signal is below a predetermine value, the output signal 94 of the comparator 62 is input to the gate circuit 95, and the residual track number signal 27 outputted from the differential count circuit 83 is input through the gate circuit 95 to the digital comparator 96. In the digital comparator 96, the track number which is beforehand set by the track number setting circuit 97 (for example, a value below several tracks) is compared with the residual track number signal 27 passed through the gate circuit 95, and the second timing signal 50 is outputted to the second switching circuit 41 when the track number and the residual track number are coincident with each other, whereby the speed control system is switched to the tracking servo system. Accordingly, when the speed control system is switched to the tracking servo system by the second switching circuit 41, the residual speed of the optical head 20 is decelerated below the seekable speed at which the optical head 20 is surely pulled onto the desired track by the comparator 62, and in addition the position of the optical head 20 where the speed control operation is switched to the tracking servo operation corresponds to a position for the residual track number of "0", that is, at a position where the optical head 20 can be surely pulled onto the desired track, so that the optical head 20 can be accurately pulled onto the desired track irrespective of the residual speed.

The construction and action other than described above are similar to those of the fifth embodiment, and thus the description thereof is eliminated.

In the fifth and sixth embodiments, it is possible to set the above prescribed position to a position which is positionally precedingly away from the desired track by a quarter track pitch. In this case, an one-shot multivibrator is driven with a track-traverse signal to output a pulse having an adjustable pulse width (time interval) at a track position just preceding to the desired track, and a timing for switching the speed control operation to the tracking servo operation is freely changed to a position (at a quarter track pitch distance, a half track pitch distance from the desired track or the like) using an tail edge of the pulse of the multivibrator.

What is claimed is:

1. In a speed control method for an optical head for optically performing an information recording or reproducing operation on or from an optical recording medium, including the steps of detecting a track-traverse motion of the optical head which traverses a track on the optical recording medium to obtain the number of residual tracks to a desired track on the basis of the tracks over which the optical head has passed, generating a reference speed signal for moving the optical head in accordance with the residual track number, and detecting a moving speed of the optical head to generate a speed detection signal, thereby performing a speed control of a seek operation of the optical head using a feedback of a different signal between the reference speed signal and the speed detection signal, said method further comprising the steps of:

in a speed control of a seek operation of the optical head using the feedback of the difference signal between the reference speed signal and the speed detection signal, switching the reference speed signal to a ground level when the residual track number is reduced below a predetermined value; and pulling the optical head into a tracking servo operation when a predetermined period has elapsed since the switch of the reference speed signal to the ground level.

2. In a speed control device for an optical head including an optical head for perform an information recording or reproducing operation on or from an optical recording medium, optical head moving means for moving the optical head in a traverse direction to tracks on the optical recording medium, tracking error signal detection means for detecting a tracking error signal from a laser beam outputted from the optical head, track traverse detection means for a track-traverse motion of the optical head based on the tracking error signal from the tracking error signal detection means, track counting means for counting the number of residual tracks to a desired track to which the optical head is moved on the basis of the track traverse signal from the track traverse detection means, reference speed signal generating means for a reference speed signal proportional to a reference speed which is beforehand set in accordance with a signal indicative of the residual track number outputted from the track counting means, optical head moving speed detection means for detecting a moving speed of the optical head on the basis of the track traverse signal outputted from the track traverse detection means to output a speed detection signal, differential amplifying means for amplifying a difference between the reference speed signal and the speed detection signal, and driving means for driving the optical head moving means through a feedback of a difference signal outputted from the differential amplifying means, said device further comprising:

first switching means for switching the reference speed signal to a ground level as an input source to the differential amplifying means;

second switching means for switching the difference signal of the differential amplifying means to a tracking servo signal as a feedback source to the driving means; and timing signal generating means for, in a speed control of a seek operation of the optical head using the feedback of the difference signal between the reference speed signal and the speed detection signal, generating a first timing signal for driving said first switching means to switch to the ground level when the residual track number is below a predetermined value and generating a second timing signal for driving the second switching means to switch to the tracking servo signal when a predetermined time interval has elapsed since the output of the first timing signal.

3. In a speed control method for an optical head for optically performing an information recording or reproducing operation on or from an optical recording medium, including the steps of detecting a track-traverse motion of the optical head which traverses a track on the optical recording medium to obtain the number of residual tracks to a desired track on the basis of the tracks over which the optical head has passed, generating a reference speed signal for moving the optical head in accordance with the residual track number, and detecting a moving speed of the optical head to generate a speed detection signal, thereby performing a speed control of a seek operation of the optical head using a feedback of a different signal between the reference speed signal and the speed detection signal, said method further comprising the steps of:

in a speed control of a seek operation of the optical head using the feedback of the difference signal between the reference speed signal and the speed detection signal, switching the reference speed signal to a ground level when the residual track number is reduced below a predetermined value; and then pulling the optical head into a tracking servo operation when the speed detection signal is below a predetermined value.

4. In a speed control device for an optical head including an optical head for perform an information recording or reproducing operation on or from an optical recording medium, optical head moving means for moving the optical head in a traverse direction to tracks on the optical recording medium, tracking error signal detection means for detecting a tracking error signal from a laser beam outputted from the optical head, track traverse detection means for a track-traverse motion of the optical head based on the tracking error signal from the tracking error signal detection means, track counting means for counting the number of residual tracks to a desired track to which the optical head is moved on the basis of the track traverse signal from the track traverse detection means, reference speed signal generating means for a reference speed signal proportional to a reference speed which is beforehand set in accordance with a signal indicative of the residual track number outputted from the track counting means, optical head moving speed detection means for detecting a moving speed of the optical head on the basis of the track traverse signal outputted from the track traverse detection means to output a speed detection signal, differential amplifying means for amplifying a difference between the reference speed signal and the speed detection signal, and driving means for driving the optical head moving means through a feedback of a difference signal outputted from the differential amplifying means, said device further comprising:

first switching means for switching the reference speed signal to a ground level as an input source to the differential amplifying means;

second switching means for switching the difference signal of the differential amplifying means to a tracking servo signal as a feedback source to the driving means; and timing signal generating means for, in a speed control of a seek operation of the optical head using the feedback of the difference signal between the reference speed signal and the speed detection signal, generating a first timing signal for driving said first switching means to switch to the ground level when the residual track number is below a predetermined value and generating a second timing signal for driving the second switching means to switch to the tracking servo signal when the speed detection signal is below a predetermined value.

5. In a speed control method for an optical head for optically performing an information recording or reproducing operation on or from an optical recording medium, including the steps of detecting a track-traverse motion of the optical head which traverses a track on the optical recording medium to obtain the number of residual tracks to a desired track on the basis of the tracks over which the optical head has passed, generating a reference speed signal for moving the optical head in accordance with the residual track number, and detecting a moving speed of the optical head to generate a speed detection signal, thereby performing a speed control of a seek operation of the optical head using a feedback of a different signal between the reference speed signal and the speed detection signal, said method further comprising the steps of:

in a speed control of a seek operation of the optical head using the feedback of the difference signal between the reference speed signal and the speed detection signal, switching the reference speed signal to a ground level when the residual track number is reduced below a predetermined value; and pulling the optical head into a tracking servo operation when a predetermined period has elapsed since the switch of the reference speed signal to the ground level and controlling the predetermined time interval and a gain for the feedback of the difference signal between the reference signal and the speed detection signal in accordance with the moving speed of the optical head.

6. In a speed control device for an optical head including an optical head for perform an information recording or reproducing operation on or from an optical recording medium, optical head moving means for moving the optical head in a traverse direction to tracks on the optical recording medium, tracking error signal detection means for detecting a tracking error signal from a laser beam outputted from the optical head, track traverse detection means for a track-traverse motion of the optical head based on the tracking error signal from the tracking error signal detection means, track counting means for counting the number of residual tracks to a desired track to which the optical head is moved on the basis of the track traverse signal from the track traverse detection means, reference speed signal generating means for a reference speed signal proportional to a reference speed which is beforehand set in accordance with a signal indicative of the residual track number outputted from the track counting means, optical head moving speed detection means for detecting a moving speed of the optical head on the basis of the track traverse signal outputted from the track traverse detection means to output a speed detection signal, differential amplifying means for amplifying a difference between the reference speed signal and the speed detection signal, and driving means for driving the optical head moving means through a feedback of a difference signal outputted from the differential amplifying means, said device further comprising:

first switching means for switching the reference speed signal to a ground level as an input source to the differential amplifying means;

second switching means for switching the difference signal of the differential amplifying means to a tracking servo signal as a feedback source to the driving means; and timing signal generating and gain controlling means for, in a speed control of a seek operation of the optical head using the feedback of the difference signal between the reference speed signal and the speed detection signal, generating a first timing signal for driving said first switching means to switch to the ground level when the residual track number is below a predetermined value and a second timing signal for driving the second switching means to switch to the tracking servo signal when a predetermined time interval has elapsed since the output of the first timing signal, and controlling the predetermined time interval and a gain for the feedback of the difference between the reference speed signal and the speed detection signal in accordance with the moving speed of the optical head.

7. In a speed control method for an optical head for optically performing an information recording or reproducing operation on or from an optical recording medium, including the steps of detecting a track-traverse motion of the optical head which traverses a track on the optical recording medium to obtain the number of residual tracks to a desired track on the basis of the tracks over which the optical head has passed, generating a reference speed signal for moving the optical head in accordance with the residual track number, and detecting a moving speed of the optical head to generate a speed detection signal, thereby performing a speed control of a seek operation of the optical head using a feedback of a different signal between the reference speed signal and the speed detection signal, said method further comprising the steps of:

in a speed control of a seek operation of the optical head using the feedback of the difference signal between the reference speed signal and the speed detection signal, switching the reference speed signal to a ground level when the residual track number is reduced below a predetermined value; and pulling the optical head into a tracking servo operation after a predetermined period has elapsed since the switch of the reference speed signal to the ground level and when the optical head passes over a predetermined track position.

8. In a speed control device for an optical head including an optical head for perform an information recording or reproducing operation on or from an optical recording medium, optical head moving means for moving the optical head in a traverse direction to tracks on the optical recording medium, tracking error signal detection means for detecting a tracking error signal from a laser beam outputted from the optical head, track traverse detection means for a track-traverse motion of the optical head based on the tracking error signal from the tracking error signal detection means, track counting means for counting the number of residual tracks to a desired track to which the optical head is moved on the basis of the track traverse signal from the track traverse detection means, reference speed signal generating means for a reference speed signal proportional to a reference speed which is beforehand set in accordance with a signal indicative of the residual track number outputted from the track counting means, optical head moving speed detection means for detecting a moving speed of the optical head on the basis of the track traverse signal outputted from the track traverse detection means to output a speed detection signal, differential amplifying means for amplifying a difference between the reference speed signal and the speed detection signal, and driving means for driving the optical head moving means through a feedback of a difference signal outputted from the differential amplifying means, said device further comprising:

- first switching means for switching the reference speed signal to a ground level as an input source to the differential amplifying means;
- second switching means for switching the difference signal of the differential amplifying means to a tracking servo signal as a feedback source to the driving means; and
- timing signal generating means for, in a speed control of a seek operation of the optical head using the feedback of the difference signal between the reference speed signal and the speed detection signal, generating a first timing signal for driving said first switching means to switch to the ground level when the residual track number is below a predetermined value and generating a second timing signal for driving the second switching means to switch to the tracking servo signal after a predetermined time interval has elapsed since the output of the first timing signal and when the optical head passes over a predetermined track position.

9. In a speed control method for an optical head for optically performing an information recording or reproducing operation on or from an optical recording medium, including the steps of detecting a track-traverse motion of the optical head which traverses a track on the optical recording medium to obtain the number of residual tracks to a desired track on the basis of the tracks over which the optical head has passed, generating a reference speed signal for moving the optical head in accordance with the residual track number, and detecting a moving speed of the optical head to generate a speed detection signal, thereby performing a speed control of a seek operation of the optical head using a feedback of a different signal between the reference speed signal and the speed detection signal, said method further comprising the steps of:

- in a speed control of a seek operation of the optical head using the feedback of the difference signal between the reference speed signal and the speed detection signal, switching the reference speed signal to a ground level when the residual track number is reduced below a predetermined value; and then
- pulling the optical head into a tracking servo operation when the speed detection signal is below a predetermined value and the optical head passes over a predetermined track position.

10. In a speed control device for an optical head including an optical head for perform an information recording or reproducing operation on or from an optical recording medium, optical head moving means for moving the optical head in a traverse direction to tracks on the optical recording medium, tracking error signal detection means for detecting a tracking error signal from a laser beam outputted from the optical head, track traverse detection means for a track-traverse motion of the optical head based on the tracking error signal from the tracking error signal detection means, track counting means for counting the number of residual tracks to a desired track to which the optical head is moved on the basis of the track traverse signal from the track traverse detection means, reference speed signal generating means for a reference speed signal proportional to a reference speed which is beforehand set in accordance with a signal indicative of the residual track number outputted from the track counting means, optical head moving speed detection means for detecting a moving speed of the optical head on the basis of the track traverse signal outputted from the track traverse detection means to output a speed detection signal, differential amplifying means for amplifying a difference between the reference speed signal and the speed detection signal, and driving means for driving the optical head moving means through a feedback of a difference signal outputted from the differential amplifying means, said device further comprising:

- first switching means for switching the reference speed signal to a ground level as an input source to the differential amplifying means;
- second switching means for switching the difference signal of the differential amplifying means to a tracking servo signal as a feedback source to the driving means; and
- timing signal generating means for, in a speed control of a seek operation of the optical head using the feedback of the difference signal between the reference speed signal and the speed detection signal, generating a first timing signal for driving said first switching means to switch to the ground level when the residual track number is below a predetermined value and generating a second timing signal for driving the second switching means to switch to the tracking servo signal when the speed detection signal is below a predetermined value, and the optical head passes over a predetermined track position.

11. In a speed control method for an optical head for optically performing an information recording or reproducing operation on or from an optical recording medium, including the steps of detecting a track-traverse motion of the optical head which traverses a track on the optical recording medium to obtain the number of residual tracks to a desired track on the basis of the tracks over which the optical head has passed, generating a reference speed signal for moving the optical head in accordance with the residual track number, and detecting a moving speed of the optical head to generate a speed detection signal, thereby performing a speed control of a seek operation of the optical head using a feedback of a different signal between the reference speed signal and the speed detection signal, said method further comprising the steps of:

- in a speed control of a seek operation of the optical head using the feedback of the difference signal between the reference speed signal and the speed detection signal, switching the reference speed signal to a ground level when the residual track number is reduced below a predetermined value; and then pulling the optical head into a tracking servo operation when the speed detection signal is below a predetermined value and the residual track number reaches a predetermined value.

12. In a speed control device for an optical head including an optical head for perform an information recording or reproducing operation on or from an optical recording medium, optical head moving means for moving the optical head in a traverse direction to tracks on the optical recording medium, tracking error signal detection means for detecting a tracking error signal from a laser beam outputted from the optical head, track traverse detection means for a track-traverse motion of the optical head based on the tracking error signal from the tracking error signal detection means, track counting means for counting the number of residual tracks to a desired track to which the optical head is moved on the basis of the track traverse signal from the track traverse detection means, reference speed signal generating means for a reference speed signal proportional to a reference speed which is beforehand set in accordance with a signal indicative of the residual track number outputted from the track counting means, optical head moving speed detection means for detecting a moving speed of the optical head on the basis of the track traverse signal outputted from the track traverse detection means to output a speed detection signal, differential amplifying means for amplifying a difference between the reference speed signal and the speed detection signal, and driving means for driving the optical head moving means through a feedback of a difference signal outputted from the differential amplifying means, said device further comprising:

first switching means for switching the reference speed signal to a ground level as an input source to the differential amplifying means;

second switching means for switching the difference signal of the differential amplifying means to a tracking servo signal as a feedback source to the driving means; and timing signal generating means for, in a speed control of a seek operation of the optical head using the feedback of the difference signal between the reference speed signal and the speed detection signal, generating a first timing signal for driving said first switching means to switch to the ground level when the residual track number is below a predetermined value and generating a second timing signal for driving the second switching means to switch to the tracking servo signal when the speed detection signal is below a predetermined value, and the residual track number reaches a predetermined value.

13. Method for controlling optical head moving speed according to any of claims 1, 3, 5, 7, 9 or 11, wherein the reference speed signal is designed so as to perform a constant decelerating operations for the optical head.

14. Device for controlling optical head moving speed according to any of claims 2, 4, 6, 8, 10 or 12, wherein the reference speed signal is designed so as to perform a constant decelerating operations for the optical head.

15. Method for controlling optical head moving speed according to any of claims 1, 5 or 7, wherein the predetermined time is enough time to reduce the moving speed of the optical head below the seekable speed at which the optical head can be surely pulled onto the desired track.

16. Device for controlling optical head moving speed according to any of claims 2, 6, or 8, wherein the predetermined time is enough time to reduce the moving speed of the optical head below the seekable speed at which the optical head can be surely pulled onto the desired track.

* * * * *

UNITED STATES PATENT AND TRADEMARK OFFICE
CERTIFICATE OF CORRECTION

PATENT NO. : 5,220,547
DATED : June 15, 1993
INVENTOR(S) : Kaoru Yasukawa et al.

It is certified that error appears in the above-indentified patent and that said Letters Patent is hereby corrected as shown below:

On the title page, item [73] Assignee: should read,
--Ltd.,--.

Claim 2, column 35, line 27, change "perform" to --performing--.

Claim 4, column 36, line 34, change "perform" to --performing--.

Claim 6, column 37, line 44, change "perform" to --performing--.

Claim 8, column 38, line 57, change "perform" to --performing--.

Claim 10, column 39, line 65, change "perform" to --performing--.

Claim 12, column 41, line 6, change "perform" to --performing--.

Claim 13, column 42, line 19, change "operations" to --operation--.

UNITED STATES PATENT AND TRADEMARK OFFICE
CERTIFICATE OF CORRECTION

PATENT NO. : 5,220,547

DATED : June 15, 1993

INVENTOR(S) : Kaoru Yasukawa et al

It is certified that error appears in the above-indentified patent and that said Letters Patent is hereby corrected as shown below:

Claim 14, column 42, line 24, change "operations" to --operation--.

Signed and Sealed this

Twenty-fifth Day of October, 1994

Attest:

BRUCE LEHMAN

Attesting Officer   Commissioner of Patents and Trademarks